United States Patent
Ito

(10) Patent No.: US 11,623,837 B2
(45) Date of Patent: *Apr. 11, 2023

(54) IMAGE READING APPARATUS

(71) Applicant: Brother Kogyo Kabushiki Kaisha, Nagoya (JP)

(72) Inventor: Tetsuo Ito, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 295 days.

This patent is subject to a terminal disclaimer.

(21) Appl. No.: 16/985,461

(22) Filed: Aug. 5, 2020

(65) Prior Publication Data

US 2020/0361736 A1 Nov. 19, 2020

Related U.S. Application Data

(63) Continuation of application No. 16/262,230, filed on Jan. 30, 2019, now Pat. No. 10,737,896.

(30) Foreign Application Priority Data

Jan. 31, 2018 (JP) .............................. JP2018-014261

(51) Int. Cl.
*B65H 29/50* (2006.01)
*B65H 29/14* (2006.01)
(Continued)

(52) U.S. Cl.
CPC .............. *B65H 29/50* (2013.01); *B65H 1/14* (2013.01); *B65H 5/062* (2013.01); *B65H 29/14* (2013.01);
(Continued)

(58) Field of Classification Search
CPC .......... B65H 1/18; B65H 31/18; B65H 29/14; B65H 29/50; B65H 2405/3321
See application file for complete search history.

(56) References Cited

U.S. PATENT DOCUMENTS 7,564,600 B2 *  7/2009  Shoji .................... B65H 29/125
                                           271/291
8,336,877 B2 * 12/2012  Yamamoto ............. B65H 29/14
                                           271/200
(Continued)

FOREIGN PATENT DOCUMENTS

JP   H10-167545 A    6/1998
JP   2002-145457 A   5/2002
(Continued)

OTHER PUBLICATIONS

Sep. 7, 2021—(JP) Notice of Reasosn for Refusal—App 2018-014261.

*Primary Examiner* — Patrick Cicchino
(74) *Attorney, Agent, or Firm* — Banner & Witcoff, Ltd.

(57) ABSTRACT

An image reading apparatus, includes: a supply tray; a discharge tray; a conveyance guide; a reading sensor; a discharge unit, which includes a discharge opening to discharge the sheet conveyed by the conveyance guide to the discharge tray and is configured to move from a third position to a fourth as the document supported by the paper feed tray is decreased, the fourth position being higher than the third position; a first drive source, which generates a drive force; a first rotation body, which moves the movable plate by transmitting the drive force from the first drive source to the movable plate; and a second rotation body, which moves the discharge unit by transmitting the drive force from the first drive source to the discharge unit, wherein a diameter of the first rotation body and a diameter of the second rotation body are different from each other.

10 Claims, 12 Drawing Sheets

(51) Int. Cl.
*B65H 1/14* (2006.01)
*H04N 1/00* (2006.01)
*B65H 5/06* (2006.01)

(52) U.S. Cl.
CPC ..... *H04N 1/00588* (2013.01); *H04N 1/00602* (2013.01); *H04N 1/00615* (2013.01); *B65H 2403/42* (2013.01); *B65H 2403/53* (2013.01); *B65H 2405/3321* (2013.01); *B65H 2801/06* (2013.01); *B65H 2801/39* (2013.01)

(56) References Cited

U.S. PATENT DOCUMENTS

| | | | |
|---|---|---|---|
| 9,670,026 B2 * | 6/2017 | Watanabe | B65H 1/12 |
| 10,554,834 B2 * | 2/2020 | Oyama | B65H 29/50 |
| 11,312,588 B2 * | 4/2022 | Heineck | B65H 29/52 |
| 2002/0056957 A1 | 5/2002 | Sekine | |
| 2011/0065574 A1 * | 3/2011 | Taguchi | B65H 31/10 |
| | | | 503/201 |
| 2018/0009613 A1 | 1/2018 | Kawanishi et al. | |

FOREIGN PATENT DOCUMENTS

| | | | |
|---|---|---|---|
| JP | 2005-008283 A | 1/2005 | |
| JP | 2008-247572 A | 10/2008 | |
| JP | 2008-285268 A | 11/2008 | |
| JP | 2009044449 A * | 2/2009 | |
| JP | 2009044449 A | 2/2009 | |
| JP | 2018-008764 A | 1/2018 | |
| WO | 2019070286 A1 | 4/2019 | |
| WO | WO-2019070286 A1 * | 4/2019 | B65H 1/04 |

\* cited by examiner

IMAGE READING APPARATUS

CROSS-REFERENCE TO RELATED APPLICATION

This application is a continuation of U.S. patent application Ser. No. 16/262,230 filed Jan. 30, 2019 which claims priority from Japanese Patent Application No. 2018-014261 filed on Jan. 31, 2018, the entire subject matters of which are incorporated herein by reference.

TECHNICAL FIELD

This disclosure relates to an image reading apparatus.

BACKGROUND

The background art discloses a document feeding device being an example of image reading apparatuses according to the background art. The document feeding device is provided with a paper feed tray, a paper discharge tray and a conveyance guide. The paper feed tray supports a supplied document. The paper discharge tray is positioned below the paper feed tray and supports the document to be discharged. The conveyance guide conveys the document from the paper feed tray to the paper discharge tray. In the middle of the conveyance guide, an image reading position for reading an image on the document to be conveyed on the conveyance guide is set.

The paper feed tray moves upward as sheets supported by the paper feed tray is decreased and approaches a document pickup unit. The document feeding device further includes a swing conveyance unit. The swing conveyance unit includes a discharge opening to discharge the document conveyed by the conveyance guide to the paper discharge tray. The swing conveyance unit moves upward as the document supported by the paper feed tray is decreased, thereby separating the discharge opening from the paper discharge tray. Specifically, a link member is installed between the paper feed tray and the swing conveyance unit, and the discharge opening of the swing conveyance unit ascends and descends by the same amount according to the ascent and descent of the paper feed tray. In this manner, the document feeding device is designed to achieve miniaturization in the up and down direction.

SUMMARY

Meanwhile, an image reading apparatus including the same configuration as that of the document feeding device described above is assumed. The image reading apparatus is provided with a supply tray including a movable body and a discharge unit. The discharge unit includes a discharge opening to discharge a sheet to a discharge tray. A link member is installed between a movable plate of the supply tray and the discharge unit. The discharge opening of the discharge unit ascends and descends by the same amount according to the ascent and descent of the movable plate of the supply tray.

However, in the image reading apparatus, in the case of satisfying required specifications such as space saving and the like, since a moving amount required for the movable plate of the supply tray and a moving amount required for the discharge unit including the discharge opening are originally different from each other, it cannot be said that a configuration in which both moving amounts required therefor are the same is the most efficient configuration.

For example, in order to secure an arrangement space of components of the discharge unit, there is a design requirement that the discharge opening should be separated from the discharge tray at a height corresponding to the above-mentioned arrangement space from the beginning. As an example of the components of the discharge unit, there are a discharge pinch roller and an energizing member to energize the discharge pinch roller and the like. In this case, the moving amount of the discharge unit tends to be smaller than the moving amount of the movable plate.

On the other hand, there is a design requirement that the discharge opening should be always set higher than the uppermost sheet even when a plurality of curled sheets are discharged to the discharge tray to form a bulky stacked state. In this case, the moving amount of the discharge unit tends to be larger than the moving amount of the movable plate.

This disclosure is to provide an image reading apparatus capable of appropriately setting a moving amount of a movable plate and a moving amount of a discharge unit according to the required specifications.

An image reading apparatus of this disclosure includes: a supply tray, which supports sheets to be supplied and includes a movable plate configured to move from a first position to a second position as the sheets supported by the supply tray is decreased, the second position being higher than the first position; a discharge tray, which is positioned below the supply tray to support the sheet to be discharged; a conveyance guide, which conveys the sheet from the supply tray to the discharge tray; a reading sensor, which reads image on the sheet to be conveyed on the conveyance guide; a discharge unit, which includes a discharge opening to discharge the sheet conveyed by the conveyance guide to the discharge tray and is configured to move from a third position to a fourth position as the document supported by the paper feed tray is decreased, the fourth position being higher than the third position; a first drive source, which generates a drive force; a first rotation body, which moves the movable plate by transmitting the drive force from the first drive source to the movable plate; and a second rotation body, which moves the discharge unit by transmitting the drive force from the first drive source to the discharge unit. A diameter of the first rotation body and a diameter of the second rotation body are different from each other.

In the image reading apparatus of this disclosure, since the diameter of a first rotation body and the diameter of a second rotation body are different from each other, it is advantageously possible to appropriately set a reduction ratio at which the drive force from a first drive source is transmitted to the movable plate via the first rotation body, and a reduction ratio at which the drive force from the first drive source is transmitted to the discharge unit via the second rotation body, respectively.

Accordingly, in the image reading apparatus, a moving amount of the movable plate and a moving amount of the discharge unit are not equal to each other, and the moving amount of the movable plate can be set to be larger than the moving amount of the discharge unit, or the moving amount of the movable plate can be set to be smaller than the moving amount of the discharge unit.

Therefore, in the image reading apparatus of this disclosure, the moving amount of the movable plate and the moving amount of the discharge unit can be appropriately set according to the required specifications. As a result, in the image reading apparatus, the moving amount of the discharge unit is set to be smaller than the moving amount of the movable plate, and the discharge opening is separated from the discharge tray at a certain height from the beginning, thereby enabling to secure an arrangement space of components of the discharge unit. Further, in the image reading apparatus, the moving amount of the discharge unit is set to be larger than the moving amount of the movable plate so that the discharge opening can be always set higher than the uppermost sheet even when a plurality of curled sheets are discharged to the discharge tray to form a bulky stacked state.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Hereinafter, first and second embodiments in which this disclosure is embodied will be described with reference to the drawings.

First Embodiment

Figure 1:
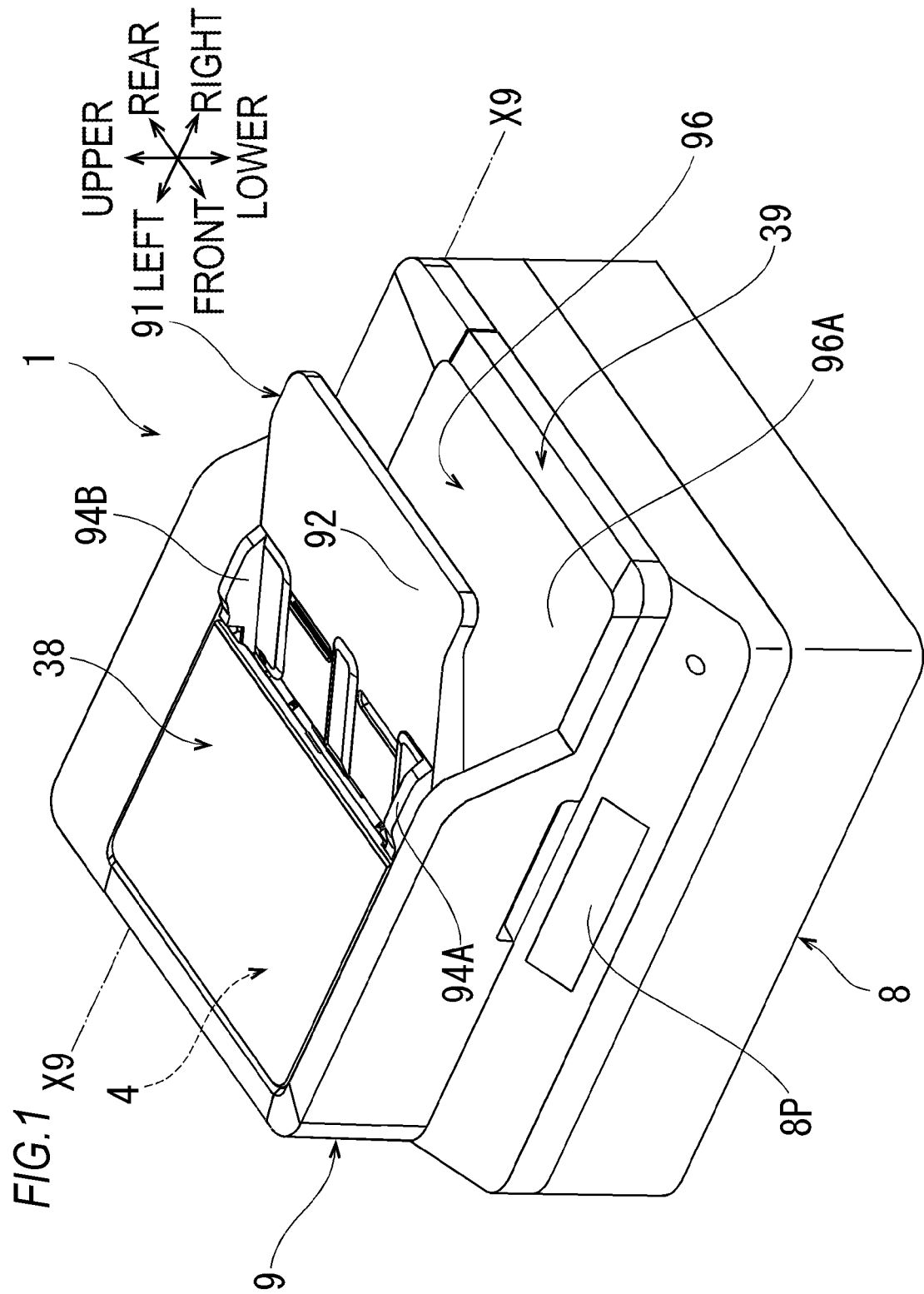
FIG. 1 is a perspective view illustrating an image reading apparatus according to a first embodiment.
Figure 2:
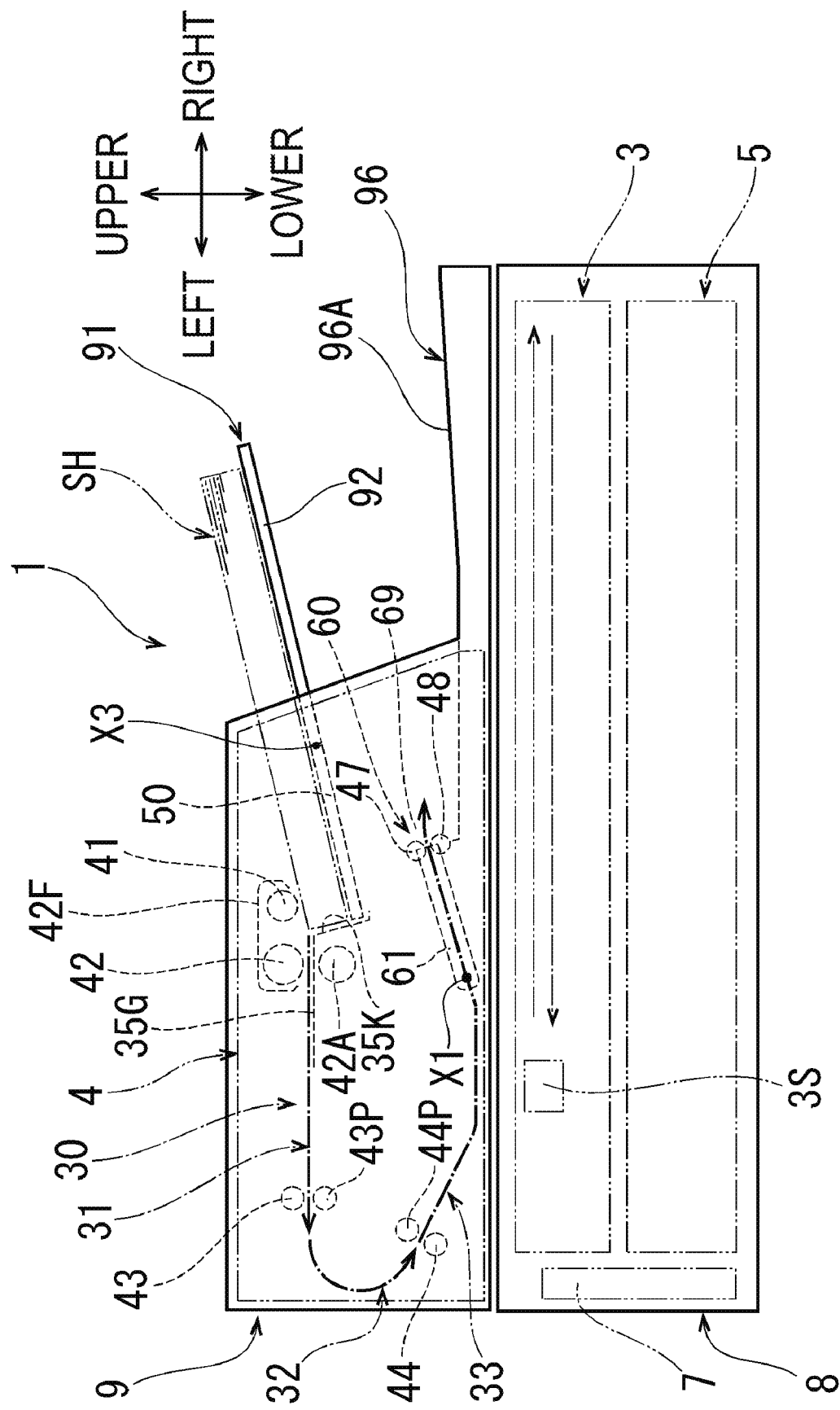
FIG. 2 is a schematic front view illustrating the image reading apparatus according to the first embodiment.

As illustrated in FIG. 1, an image reading apparatus 1 of a first embodiment is an example of a specific aspect of the image reading apparatus of this disclosure. In FIG. 1, a side on which an operation panel 8P is disposed is defined as a front side of a device, and a side which comes to the left when facing the operation panel 8P is defined as a left side, thereby displaying respective directions of front, rear, left, right, upper and lower sides. Then, each direction illustrated in each drawing from FIG. 2 is displayed corresponding to each direction illustrated in FIG. 1. Hereinafter, respective components provided in the image reading apparatus 1 will be described based on FIG. 1 and the like.

<Overall Configuration>

As illustrated in FIGS. 1 to 4, the image reading apparatus 1 includes a main body unit 8, an opening and closing unit 9, an image forming unit 5, a reading unit 3, an automatic conveyance mechanism 4 and a controller 7. The main body unit 8 is an approximately flat box-shaped body. As illustrated in FIG. 1, the operation panel 8P which is a touch panel and the like is provided on a front surface of the main body unit 8.

Figure 5:
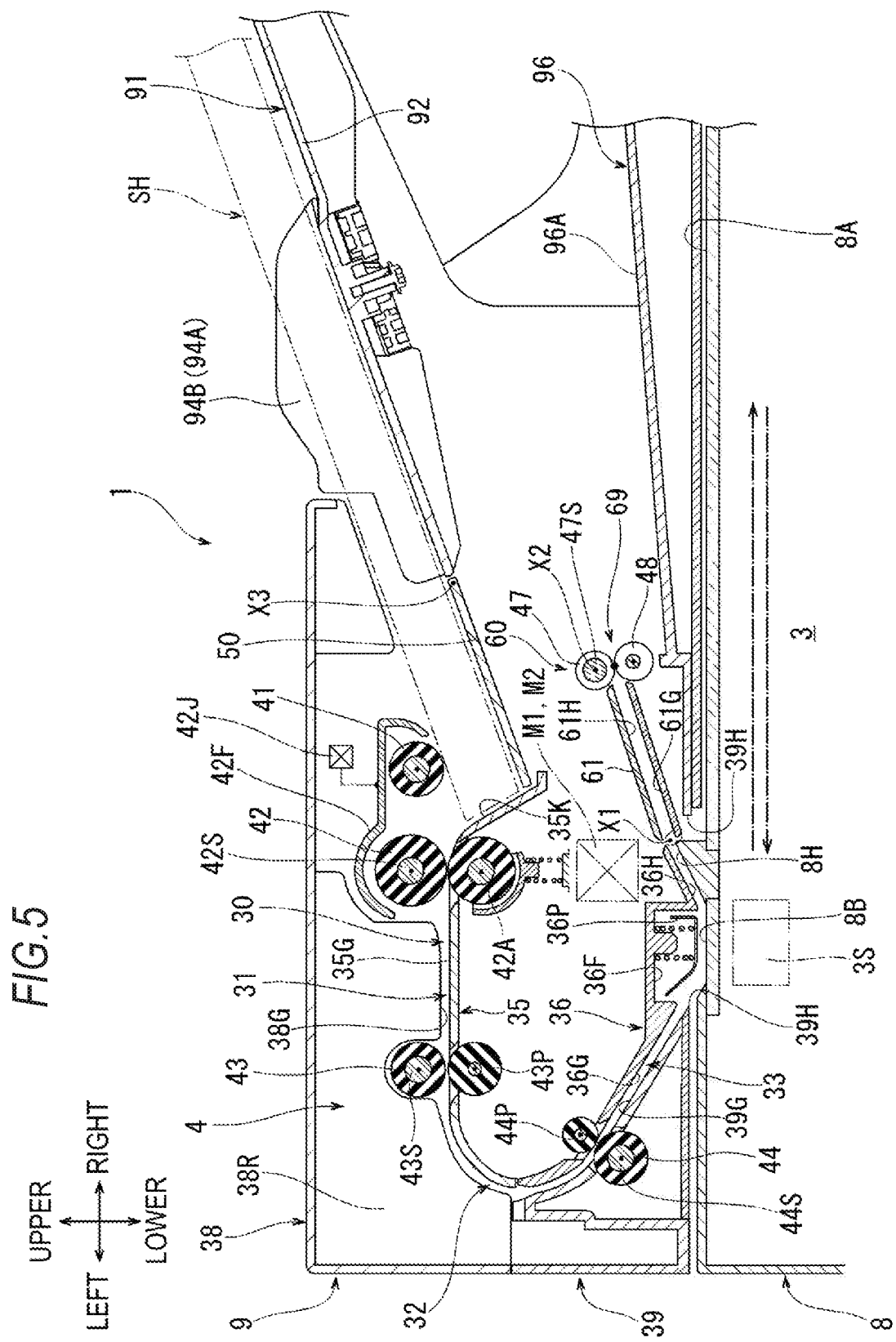
FIG. 5 is a partial cross-sectional view illustrating the image reading apparatus according to the first embodiment.

As illustrated in FIG. 2, the image forming unit 5 is stored at a lower portion in the main body unit 8. The image forming unit 5 forms an image on a sheet by an ink jet method, a laser method, or the like. As illustrated in FIGS. 2 and 5, the reading unit 3 is positioned at an upper portion in the main body unit 8. The reading unit 3 is used when reading an image on a document. The automatic conveyance mechanism 4 is provided in the opening and closing unit 9. The automatic conveyance mechanism 4 is used when allowing the reading unit 3 to read an image on a sheet SH while sequentially conveying the sheet SH supported by a supply tray 91 along a conveyance guide 30.

Figure 4:
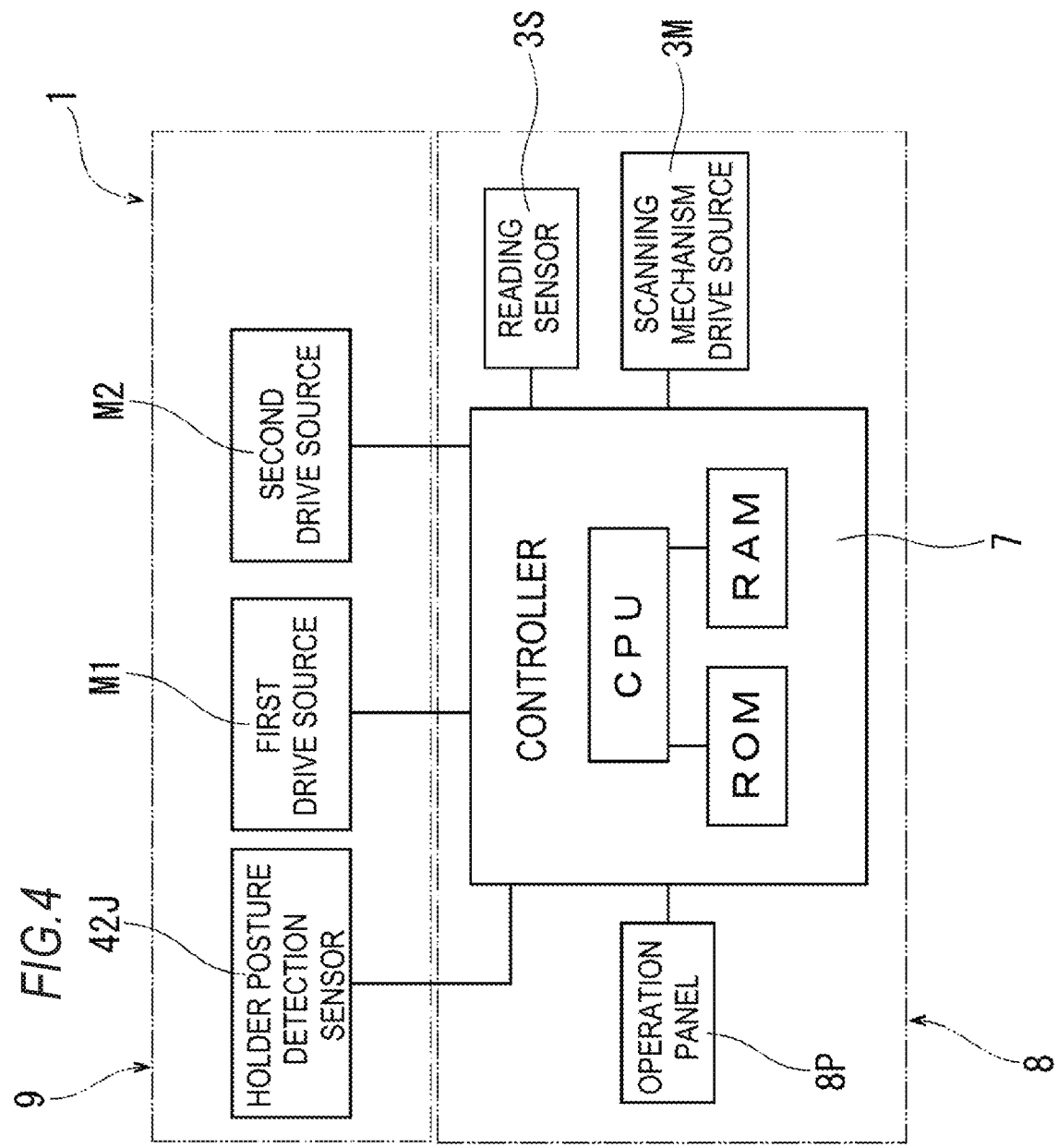
FIG. 4 is a block diagram illustrating the image reading apparatus according to the first embodiment.

As illustrated in FIGS. 2 and 4, the controller 7 is stored at a position along a left side surface in the main body unit 8. The controller 7 is formed as a microcomputer mainly including a CPU, a ROM and a RAM. The ROM stores a program for the CPU to control various operations of the image reading apparatus 1, a program for performing identification processing and the like. The RAM is used as a storage region for temporarily recording data and signals used when the CPU executes the programs, or as a work region for data processing. The controller 7 controls the image forming unit 5, the reading unit 3, the automatic conveyance mechanism 4 and the operation panel 8P.

As illustrated in FIG. 5, platen glass is disposed on an upper surface of the main body unit 8 and a document supporting surface 8A with a large area is formed by an upper surface of the platen glass. Further, another platen glass is disposed on a left side further than the document supporting surface 8A on the upper surface of the main body unit 8, and an elongated reading surface 8B is formed in a front and rear direction by an upper surface of the another platen glass.

The document supporting surface 8A supports the document from below when the reading unit 3 reads an image on the document in a stationary state. The document which is an object to be read includes a sheet such as a paper, or an OHP sheet as well as a book and the like.

The reading surface 8B contacts the conveyed sheet SH from below when the reading unit 3 reads the image on the sheet SH conveyed one by one by the automatic conveyance mechanism 4. A guide protruding unit 8H is provided between the document supporting surface 8A and the reading surface 8B on the upper surface of the main body unit 8. The guide protruding unit 8H scoops up the sheet SH to be conveyed while contacting the reading surface 8B and guides the sheet SH so as to be inclined upward to the right.

Further, in the embodiment, an object whose image is read by using the document supporting surface 8A is described as a document, and an object whose image is read while being conveyed by the automatic conveyance mechanism 4 is described as a sheet. The document and the sheet may be substantially the same.

As illustrated in FIG. 1, the opening and closing unit 9 is supported to be able to oscillate around an opening and closing axis X9 extending in the left and right direction by a hinge, which is not illustrated and disposed at a rear end part of the main body unit 8. The opening and closing unit 9 covers the document supporting surface 8A and the reading surface 8B from above in a closed state illustrated in FIGS. 1 and 5 and the like. Although illustration is omitted, the opening and closing unit 9 is displaced to an open position where the document supporting surface 8A and the reading surface 8B are exposed by oscillating around the opening and closing axis X9 so that the front end part thereof is displaced upward and rearward. Accordingly, a user can support the document which is an object to be read on the document supporting surface 8A.

Further, when describing a configuration, an internal structure and the like of the opening and closing unit 9, a posture of the opening and closing unit 9 in a closed state is set as a reference in the up and down direction and the front and rear direction.

The reading unit 3 includes a reading sensor 3S stored at an upper portion in the main body unit 8 as illustrated in FIGS. 2 to 6, a scanning mechanism drive source 3M illustrated in FIG. 4 and a scanning mechanism, which is not illustrated, driven by the scanning mechanism drive source. As the reading sensor 3S, a well-known image reading sensor such as a contact image sensor (CIS), a charge coupled device (CCD) and the like is used.

As illustrated in FIG. 5, the reading sensor 3S is positioned below the document supporting surface 8A and the reading surface 8B. The scanning mechanism, which is not illustrated, is driven by the scanning mechanism drive source 3M when reading the image on the document supported by the document supporting surface 8A, and the reading sensor 3S is reciprocated in the left and right direction below the document supporting surface 8A in the main body unit 8. Further, the scanning mechanism, which is not illustrated, is driven by the scanning mechanism drive source 3M when the reading sensor 3S reads the image on the sheet SH conveyed by the automatic conveyance mechanism 4, and the reading sensor 3S is stopped under the reading surface 8B in the main body unit 8. A position where the reading sensor 3S is stopped under the reading surface 8B is a predetermined stationary reading position.

Figure 6:
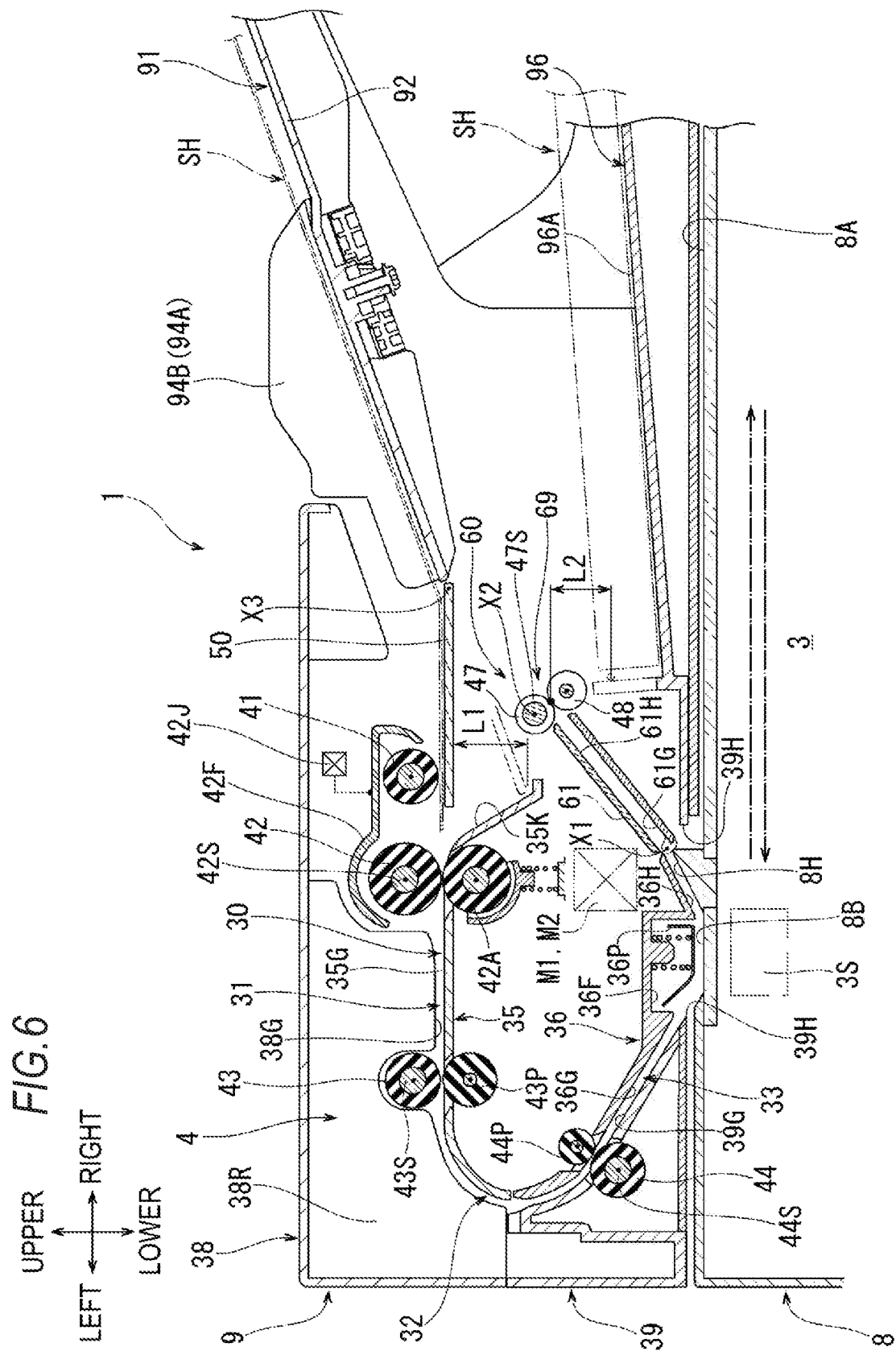
FIG. 6 is a partial cross-sectional view illustrating the image reading apparatus according to the first embodiment.

As illustrated in FIGS. 5 and 6, the opening and closing unit 9 includes a base member 39, a first chute member 35, a second chute member 36 and a cover member 38.

The base member 39 forms a bottom wall of the opening and closing unit 9. In the base member 39, a rectangular hole 39H in which a region opposite to the reading surface 8B and the guide protruding unit 8H is cut out in an approximately rectangular shape is formed. A conveyance surface 39G is formed at a portion positioned on the left side further than the rectangular hole 39H in the base member 39. A left end part of the conveyance surface 39G is curved to be inclined downward to the right by changing a direction from a downward direction. The conveyance surface 39G is inclined downward up to a left end edge of the rectangular hole 39H.

The second chute member 36 is disposed above a left portion of the base member 39. A pressing member holding part 36F and guide surfaces 36G and 36H are formed in the second chute member 36. The pressing member holding part 36F is a recessed portion which is recessed upward at a position opposite to the reading surface 8B. In the pressing member holding unit 36F, a pressing member 36P is held to be able to be displaced in the up and down direction. The pressing member 36P presses the sheet SH conveyed while contacting the reading surface 8B from above, thereby preventing the sheet SH from floating from the reading surface 8B. The guide surface 36G is positioned on the left side further than the pressing member holding part 36F. A left end part of the guide surface 36G is curved along the left end part of the conveyance surface 39G of the base member 39. The guide surface 36G is inclined downward to the right along a portion inclined downward of the conveyance surface 39G of the base member 39. The guide surface 36H is positioned on the right side further than the pressing member holding part 36F. The guide surface 36H is inclined upward to the right along the guide protruding unit 8H of the main body unit 8.

The first chute member 35 is disposed above the second chute member 36. A regulation surface 35K and a conveyance surface 35G are formed in the first chute member 35. The regulation surface 35K is inclined upward to the left from a right end part of the first chute member 35. The conveyance surface 35G is connected to an upper end of the regulation surface 35K and extends approximately horizontally to the left. A left end part of the conveyance surface 35G is curved so as to change a direction thereof from the left direction to the downward direction.

The cover member 38 is disposed above the first chute member 35.

A guide surface 38G which is formed by lower end edges of a plurality of ribs 38R protruding downward is formed in the cover member 38. A right end part of the guide surface 38G is opposite to the conveyance surface 35G from above at a position deviated to the left side further than a connection unit between the regulation surface 35K and the conveyance surface 35G in the first chute member 35. The guide surface 38G extends approximately horizontally to the left along the conveyance surface 35G of the first chute member 35. A left end part of the guide surface 38G is curved along the left end part of the conveyance surface 35G of the first chute member 35.

Figure 7:
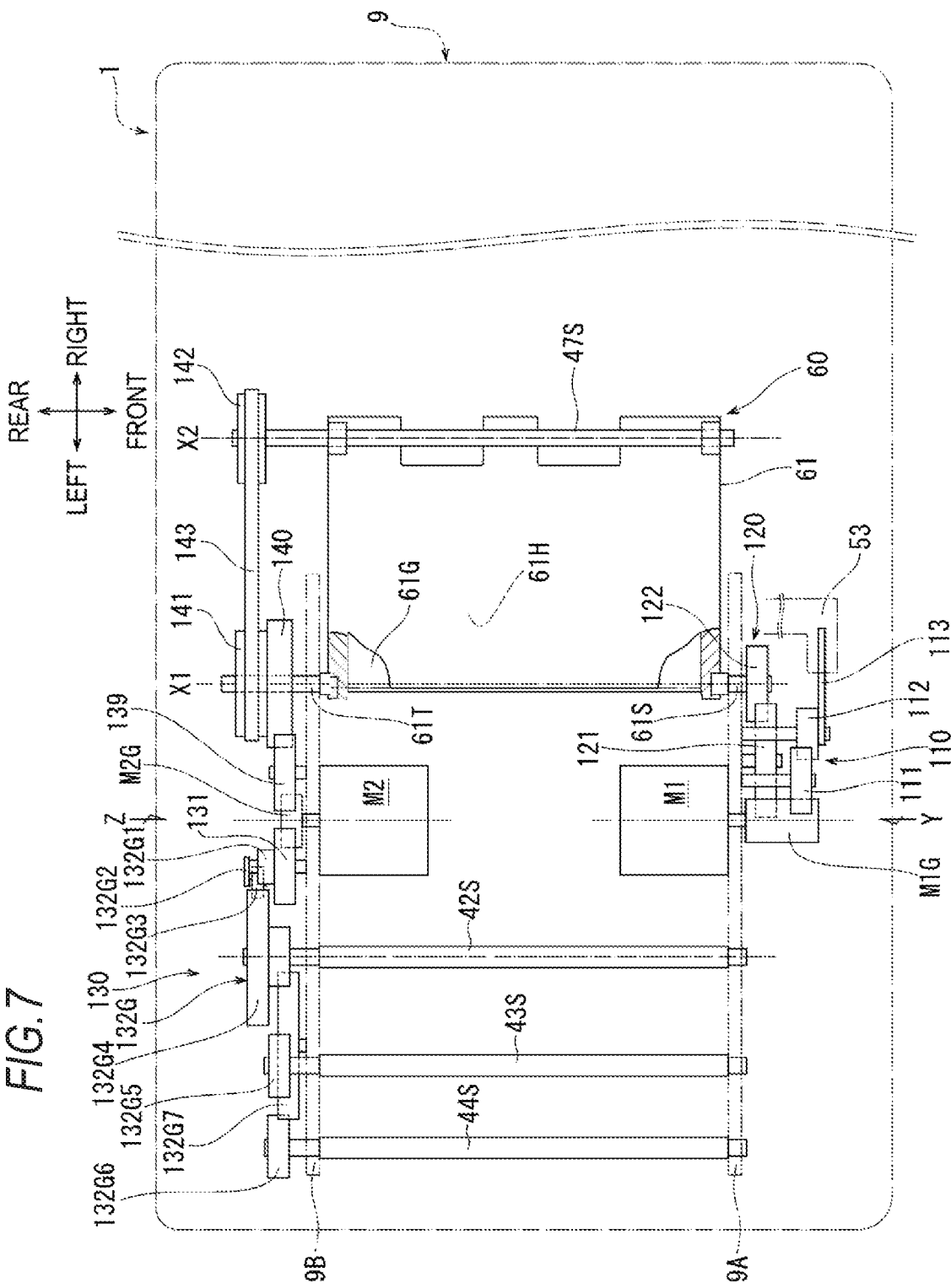
FIG. 7 is a schematic top view illustrating the image reading apparatus according to the first embodiment.
Figure 8:
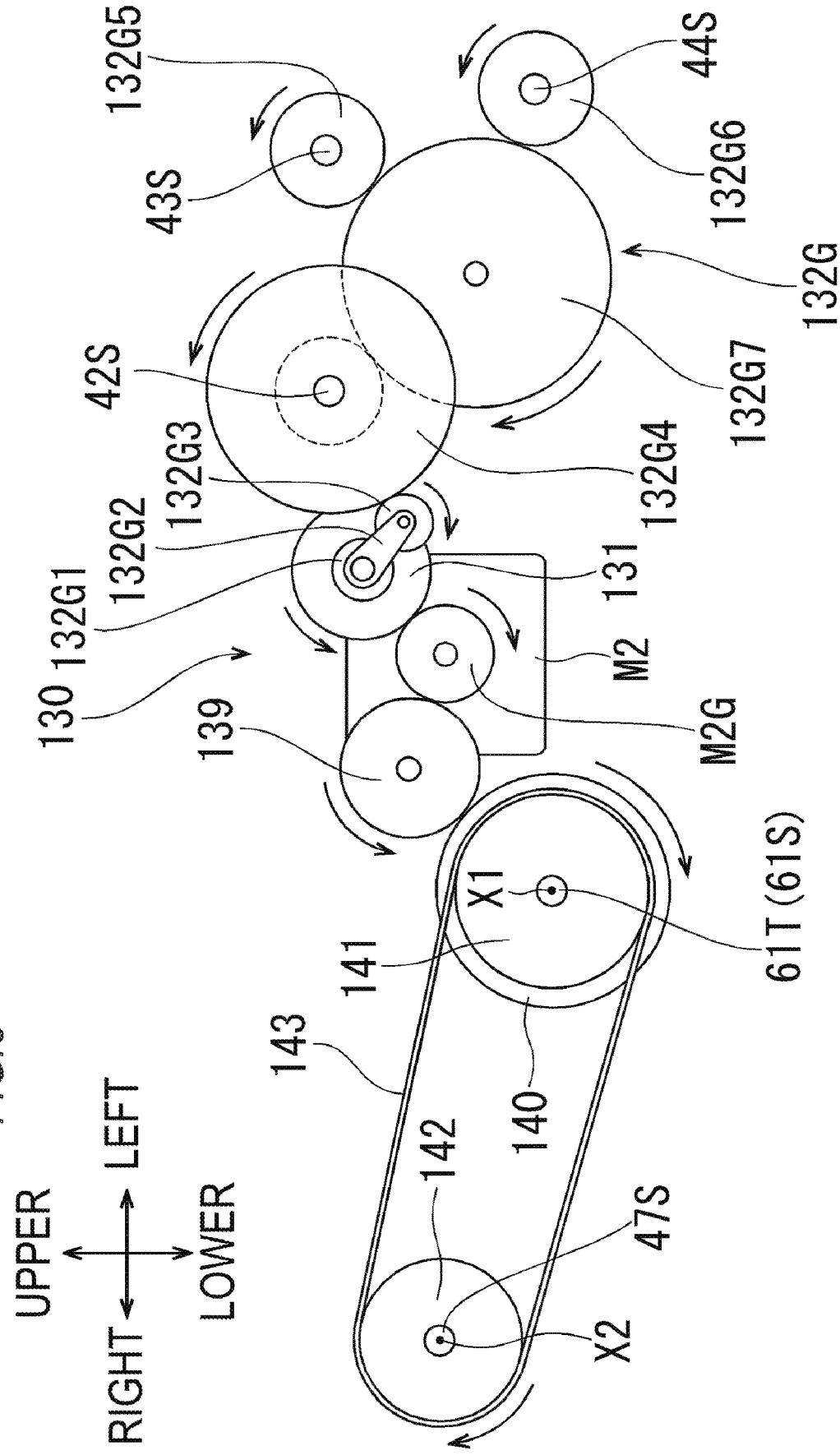
FIG. 8 is a schematic diagram illustrating a second drive source, a conveyance drive train and the like, as viewed from an arrow Z direction in FIG. 7.

As illustrated in FIG. 7, the opening and closing unit 9 includes a first side frame 9A and a second side frame 9B. The first side frame 9A is disposed to extend in the left and right direction on the front side of the opening and closing unit 9 and forms a part of an internal frame of the opening and closing unit 9. The second side frame 9B is disposed to extend in the left and right direction on the rear surface side of the opening and closing unit 9 and forms a part of the internal frame of the opening and closing unit 9. The first side frame 9A and the second side frame 9B are opposite to each other in the front and rear direction so that the guide surface 38G of the cover member 38, the regulation surface 35K and the conveyance surface 35G of the first chute member 35, the guide surfaces 36G and 36H of the second chute member 36 and the conveyance surface 39G of the base member 39, all of which are illustrated in FIG. 5, are sandwiched therebetween. Further, in FIG. 7, illustration of a supply tray main body 92 and a movable plate 50 of the supply tray 91 is omitted for ease of description. Additionally, FIG. 7 illustrates that positions of a first drive source M1 and a second drive source M2 are deviated to the right side from a position lower than a rotation shaft 42S of a separation roller 42 for ease of description. Also, FIG. 8 illustrates that the position of the second drive source M2 is deviated to the right side from the position lower than the rotation shaft 42S of the separation roller 42.

As illustrated in FIGS. 2, 3, 5, and 6, the opening and closing unit 9 includes the conveyance guide 30 forming a unit of the automatic conveyance mechanism 4, the supply tray 91 for supporting the sheet SH supplied to the conveyance guide 30 and a discharge tray 96 for supporting the sheet SH discharged from the conveyance guide 30.

As illustrated in FIG. 5, the supply tray 91 is positioned on the right side further than the first chute member 35 and is disposed above a right portion of the base member 39. The supply tray 91 includes the supply tray main body 92 and the movable plate 50. The supply tray main body 92 is gently inclined downward from a right end part side of the opening and closing unit 9 to the left. The movable plate 50 is disposed to be adjacent to a left end part of the supply tray main body 92. The movable plate 50 extends in an approximately flat plate shape toward the regulation surface 35K of the first chute member 35. The movable plate 50 is covered with a right portion of the cover member 38 from above. The supply tray 91 supports the sheet SH supplied to the automatic conveyance mechanism 4 by the supply tray main body 92 and the movable plate 50.

The movable plate 50 is rotatably supported around a third axis X3, the right end part of which extends in the front and rear direction. Even though illustration is omitted, the movable plate 50 is rotatably supported by the first side frame 9A and the second side frame 9B illustrated in FIG. 7.

Figure 3:
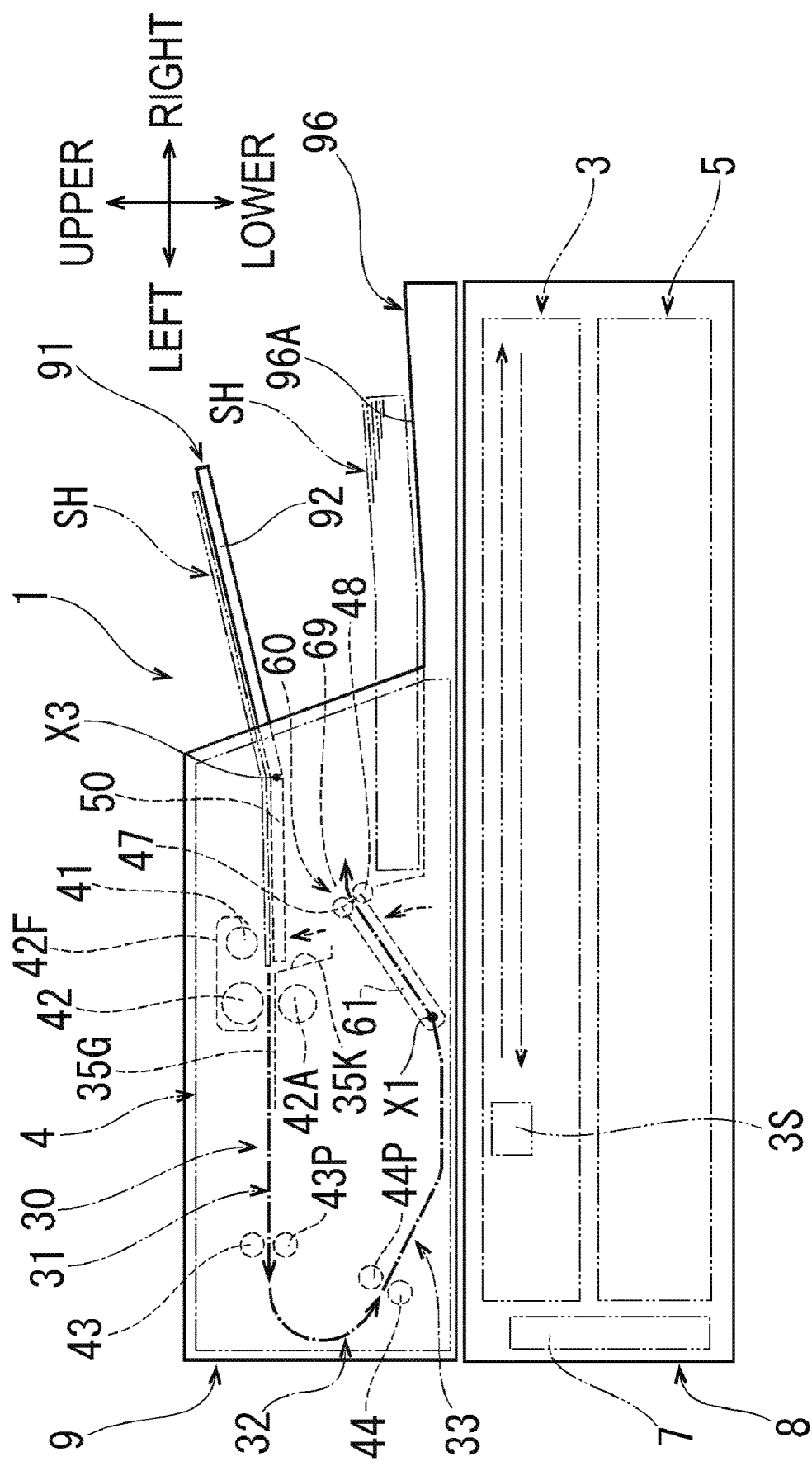
FIG. 3 is a schematic front view illustrating the image reading apparatus according to the first embodiment.

As will be described later in detail, the movable plate 50 is configured to rotate from a first position illustrated in FIGS. 2, 5 and 9 to a second position illustrated in FIGS. 3, 6 and 10 by operating the first drive source M1 and a first drive train 110 illustrated in FIGS. 7 and 9 and the like according to the decrease of the sheets SH supported by the supply tray 91. The second position illustrated in FIG. 6 and the like is a position above the first position illustrated in FIG. 5 and the like. In other words, the second position is higher than the first position.

As illustrated in FIGS. 1 and 5, two width regulation guides 94A and 94B are provided on the supply tray main body 92 to be respectively slidable in the front and rear direction. A plurality of types of the sheets SH having a different size supported by the supply tray 91 are sandwiched from the front side and the rear side in such a manner that the front width regulation guide 94A and the rear width regulation guide 94B approach each other or are separated from each other. Accordingly, the sheets SH having various sizes can be determined to be positioned based upon a center part in a width direction of the supply tray 91 as a reference.

As illustrated in FIG. 5, the discharge tray 96 is formed on the right portion of the base member 39. That is, the discharge tray 96 is provided so as to be overlapped with the supply tray 91 at a position lower than the supply tray 91. In the discharge tray 96, the sheet SH of which image is read by the reading sensor 3S and which is conveyed by the automatic conveyance mechanism 4 is discharged. An upper surface of the discharge tray 96 is a sheet supporting surface 96A for supporting the sheet SH to be discharged.

The conveyance guide 30 forms a conveyance path for conveying the sheet SH from the supply tray 91 toward the discharge tray 96. Specifically, the conveyance guide 30 includes a first guide 31, a second guide 32 and a third guide 33.

The first guide 31 is configured to include an approximately horizontally extending portion of the conveyance surface 35G of the first chute member 35 and an approximately horizontally extending portion of the guide surface 38G of the cover member 38. The first guide 31 guides the sheet SH sent out from the supply tray 91 to the left.

The second guide 32 is configured to include a curved left end part of the conveyance surface 35G of the first chute member 35; a curved left end part of the guide surface 38G of the cover member 38; a curved left end part of the conveyance surface 39G of the base member 39; and a curved left end part of the guide surface 36G of the second chute member 36. The second guide 32 is connected to the first guide 31 and changes the conveyance direction of the sheet SH from the left direction to the right direction.

The third guide 33 is configured to include a downwardly inclined portion of the conveyance surface 39G of the base member 39; a downwardly inclined portion of the guide surface 36G of the second chute member 36; and the guide surface 36H of the second chute member 36. The third guide 33 is connected to the second guide 32 and guides the sheet SH toward the discharge tray 96.

The automatic conveyance mechanism 4 includes a discharge unit 60 to discharge the sheet SH guided by the third guide 33 to the discharge tray 96 by a discharge guide 61. The conveyance surface 61G and the guide surface 61H are formed in the discharge guide 61. The conveyance surface 61G is positioned on the right side further than the guide protruding unit 8H of the main body unit 8 and is inclined upward to the right. The guide surface 61H is positioned on the right side further than the guide surface 36H of the second chute member 36. The guide surface 61H is inclined upward to the right along the conveyance surface 61G. The discharge guide 61 includes a discharge opening 69 to discharge the sheet SH to the discharge tray 96. The discharge opening 69 is opened between a right end part of the conveyance surface 61G and a right end part of the guide surface 61H.

As illustrated in FIG. 7, in the discharge unit 60, the discharge guide 61 is an approximately angular cylindrical member in which a flat plate on which the conveyance surface 61G is formed and a flat plate on which the guide surface 61H is formed are opposite to each other in the up and down direction and a front end edge and a rear end edge of the both flat plates are connected to each other by a pair of front and rear side plates. The discharge guide 61 includes shaft units 61S and 61T in which a first axis X1 extending in the front and rear direction is set as an axis. The first axis X1 is parallel with the third axis X3.

The front shaft unit 61S is a cylindrical shaft protruding forward from a front and left corner part of the conveyance surface 61G and the guide surface 61H. The front shaft unit 61S is rotatably supported by the first side frame 9A and protrudes forward further than the first side frame 9A.

The rear shaft unit 61T is a cylindrical shaft protruding rearward from a rear and left corner part of the conveyance surface 61G and the guide surface 61H. The rear shaft unit 61T is rotatably supported by the second side frame 9B and protrudes rearward further than the second side frame 9B.

Accordingly, the discharge guide 61 is rotatable around the first axis X1. As illustrated in FIG. 5, a position of the first axis X1 is set so as to be overlapped with a conveyance path formed by the third guide 33 of the conveyance guide 30 and the discharge guide 61.

The discharge unit 60 includes a discharge roller 47 and a discharge pinch roller 48. The discharge roller 47 is disposed above the discharge opening 69. The discharge pinch roller 48 is disposed below the discharge opening 69. Although not illustrated herein, a plurality of sets of discharge rollers 47 and discharge pinch rollers 48 are disposed with an interval in the front and rear direction.

The discharge roller 47 is fixed to a rotation shaft 47S having the second axis X2 parallel with the first axis X1 as an axis. As illustrated in FIG. 7, a front end part of the rotation shaft 47S is rotatably supported at a front and right corner part of the discharge guide 61. A rear end part side of the rotation shaft 47S is rotatably supported at a rear and right corner part of the discharge guide 61. The rear end part of the rotation shaft 47S protrudes rearward further than the discharge guide 61. Accordingly, the discharge roller 47 is supported by the discharge guide 61 to be rotatable around the second axis X2.

Figure 9:
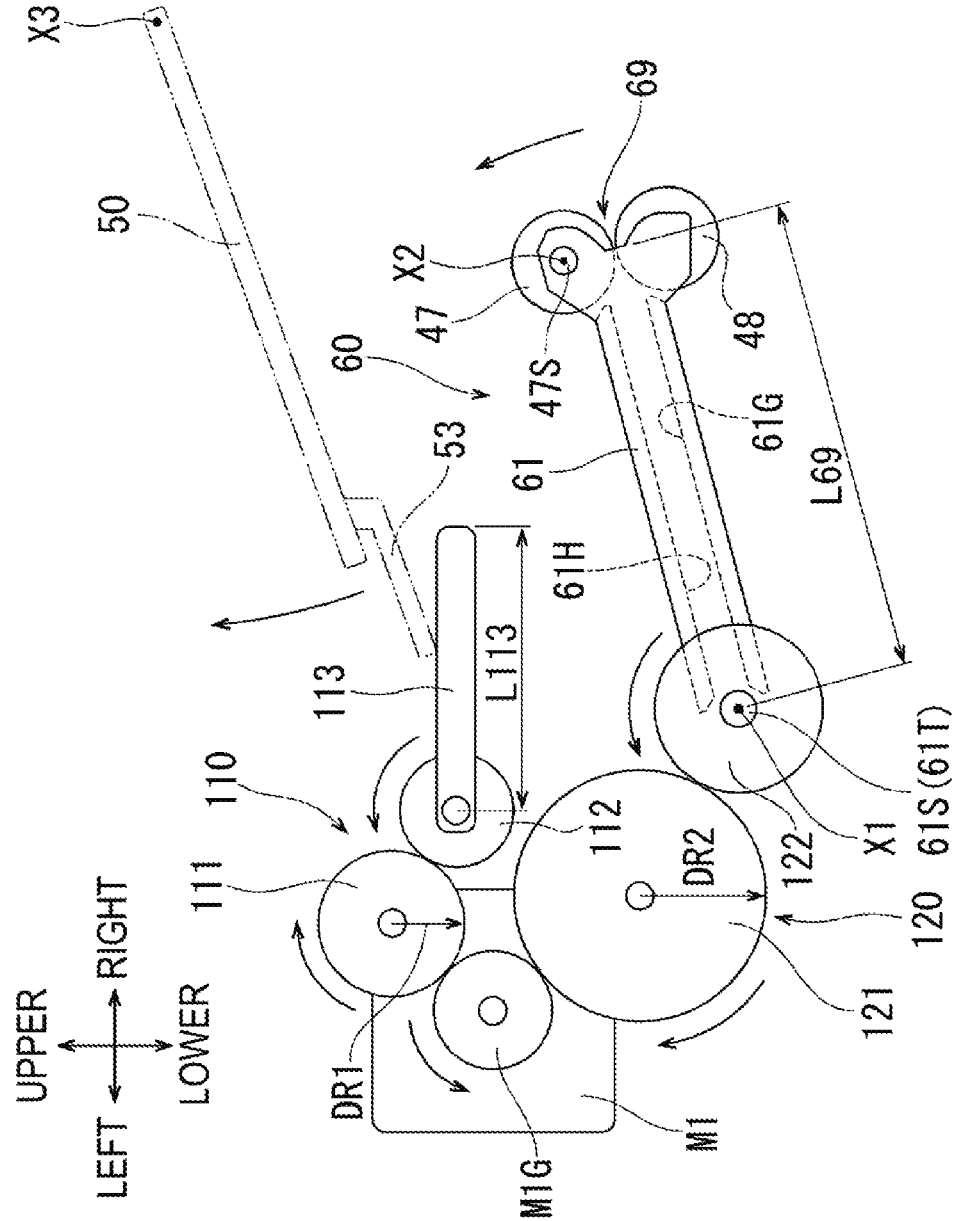
FIG. 9 is a schematic diagram illustrating a movable plate, a discharge unit, a first drive source, a first drive train, a second drive train and the like, as viewed from an arrow Y direction in FIG. 7, and is a diagram illustrating a state where the movable plate is positioned at a first position and the discharge unit is positioned at a third position.

As illustrated in FIGS. 5 and 9, the discharge pinch roller 48 is rotatably supported at a right end part of the discharge guide 61 and is opposite to the discharge roller 47 from below. The conveyance surface 61G and the guide surface 61H of the discharge guide 61 guide the sheet SH toward a nip position between the discharge roller 47 and the discharge pinch roller 48.

As will be described later in detail, the discharge unit 60 is configured to rotate from a third position illustrated in FIGS. 2, 5 and 9 to a fourth position illustrated in FIGS. 3, 6 and 10 by operating the first drive source M1 and a second drive train 120 illustrated in FIGS. 7 and 9 and the like corresponding to the decrease of the sheets SH supported by the supply tray 91. The fourth position illustrated in FIG. 6 and the like is a position above the third position illustrated in FIG. 5 and the like. In other words, the fourth position is higher than the third position.

As illustrated in FIG. 5, the automatic conveyance mechanism 4 includes a supply roller 41, the separation roller 42, a retard roller 42A, a first conveyance roller 43, a first pinch roller 43P, a second conveyance roller 44, a second pinch roller 44P, the discharge roller 47 and the discharge pinch roller 48 for conveying the sheet SH along the conveyance guide 30. The discharge roller 47 and the discharge pinch roller 48 are a part of the above-mentioned discharge unit 60.

The supply roller 41, the separation roller 42, the first conveyance roller 43, the second conveyance roller 44 and the discharge roller 47 are an example of "the conveyance roller" of this disclosure. Further, the front and rear direction is an example of "an axial direction of the conveyance roller".

As illustrated in FIG. 7, the rotation shaft 42S of the separation roller 42, a rotation shaft 43S of the first conveyance roller 43 and a rotation shaft 44S of the second conveyance roller 44 are rotatably supported by the first side frame 9A and the second side frame 9B. Respective rear end parts of the rotation shafts 42S, 43S and 44S protrude rearward further than the second side frame 9B.

As illustrated in FIGS. 7 and 8, the automatic conveyance mechanism 4 includes the second drive source M2 and a conveyance drive train 130 for driving the supply roller 41, the separation roller 42, the first conveyance roller 43, the second conveyance roller 44 and the discharge roller 47. Further, in the embodiment, with respect to each gear forming the second drive source M2 and the conveyance drive train 130, illustration of gear teeth formed on the outer peripheral surface is omitted in FIGS. 7 and 8 and the like.

As illustrated in FIG. 5, the second drive source M2 is disposed between the first guide 31 and the third guide 33. As illustrated in FIG. 7, the second drive source M2 is mounted on a surface facing a front side of the second side frame 9B. A drive shaft of the second drive source M2 protrudes rearward further than the second side frame 9B and a drive gear M2G is fixed to the drive shaft. In the embodiment, the second drive source M2 is a stepping motor. The second drive source M2 is controlled by the controller 7 to generate a drive force, thereby rotating the drive gear M2G clockwise in FIG. 8.

As illustrated in FIGS. 7 and 8, the conveyance drive train 130 is disposed behind the second side frame 9B and is supported by a plurality of shaft units protruding rearward from the second side frame 9B. The conveyance drive train 130 includes a gear 131 which is positioned on a left and upper side with respect to the drive gear M2G and is engaged with the drive gear M2G; and a plurality of gear groups 132G which transmit a drive force from the second drive source M2 via the gear 131. The plurality of gear groups 132G include a sun gear 132G1 integrally rotating with the gear 131 and a planetary gear 132G3 connected to the sun gear 132G1 by an arm 132G2. Further, the plurality of gear groups 132G include gears 132G4, 132G5, 132G6 and 132G7. The gear 132G4 is engaged with the planetary gear 132G3, thereby integrally rotating with the rotation shaft 42S of the separation roller 42. The gear 132G5 transmits the drive force from the gear 132G4 via the gear 132G7, thereby integrally rotating with the rotation shaft 43S of the first conveyance roller 43. The gear 132G6 transmits the drive force from the gear 132G4 via the gear 132G7, thereby integrally rotating with the rotation shaft 44S of the second conveyance roller 44. Further, when the jammed sheet SH is removed in the conveyance guide 30, the gears 132G4, 132G5 and 132G6 become free to rotate by separating the planetary gear 132G3 from the gear 132G4. As a result, the jammed sheet SH can be easily removed.

The plurality of gear groups 132G transmit the drive force from the second drive source M2 to the rotation shaft 42S of the separation roller 42, the rotation shaft 43S of the first conveyance roller 43 and the rotation shaft 44S of the second conveyance roller 44 and rotate the separation roller 42, the first conveyance roller 43 and the second conveyance roller 44, in a direction in which the sheet SH is conveyed toward the reading sensor 3S stopped at a stationary reading position, that is, counter-clockwise illustrated in FIG. 8.

Further, the conveyance drive train 130 includes a gear 139 which is positioned rightward with respect to the drive gear M2G and is engaged with the drive gear M2G, a gear 140 which transmits the drive force from the second drive source M2 to the discharge roller 47 via the gear 139, a first discharge roller drive pulley 141, a timing belt 143 and a second discharge roller drive pulley 142.

The gear 140 and the first discharge roller drive pulley 141 are formed as one member. The gear 140 and the first discharge roller drive pulley 141 are inserted into the rear shaft unit 61T of the discharge guide 61 to be rotatable independently. Accordingly, the first discharge roller drive pulley 141 is rotatable around the first axis X1 integrally with the gear 140 engaged with the gear 139. The timing belt 143 is wound around the first discharge roller drive pulley 141 and the second discharge roller drive pulley 142. The second discharge roller drive pulley 142 is fixed to a rear end part of the rotation shaft 47S of the discharge roller 47. The gears 139 and 140, the first discharge roller drive pulley 141, the timing belt 143 and the second discharge roller drive pulley 142 transmit the drive force from the second drive source M2 to the rotation shaft 47S of the discharge roller 47 and then rotate the discharge roller 47 in a direction in which the sheet SH is discharged to the discharge tray 96, that is, clockwise in FIG. 8.

An interval between the first axis X1 of the first discharge roller drive pulley 141 and the second axis X2 of the second discharge roller drive pulley 142 does not change even though the discharge guide 61 rotates. Therefore, even when the discharge guide 61 rotates, tension of the timing belt 143 hardly fluctuates and thus, the drive force can be appropriately transmitted from the first discharge roller drive pulley 141 to the second discharge roller drive pulley 142.

As illustrated in FIG. 5, the separation roller 42 is disposed at a position deviated on the left side further than the connection part between the regulation surface 35K and the conveyance surface 35G in the first chute member 35.

A holder 42F is rotatably supported in the rotation shaft 42S of the separation roller 42. The holder 42F protrudes rightward to be separated from the rotation shaft 42S and to exceed the regulation surface 35K.

The supply roller 41 is rotatably held at a right end part of the holder 42F. The supply roller 41 is provided at a position opposite to the movable plate 50 from above. The rotation shaft 42S and a transmission gear group, which is not illustrated and provided in the holder 42F, transmit the drive force from the second drive source M2 to the supply roller 41, thereby rotating the supply roller 41 in a direction in which the sheet SH supported by the supply tray 91 is sent out to the conveyance guide 30. The supply roller 41 can be displaced in the up and down direction depending on the rotation of the holder 42F.

A holder posture detection sensor 42J is provided in the opening and closing unit 9. The holder posture detection sensor 42J detects whether or not a posture of the holder 42F is an appropriate posture illustrated in FIGS. 5 and 6 and then transmits the detected posture thereof to the controller 7. In a state where the holder 42F is in the appropriate posture illustrated FIGS. 5 and 6, a lower end part of the supply roller 41 has approximately the same height as that of the conveyance surface 35G of the first chute member 35. In this state, the supply roller 41 can appropriately send out the uppermost sheet SH among the sheets SH supported by the supply tray 91 toward the conveyance surface 35G, that is, toward a space between the separation roller 42 and the retard roller 42A.

The retard roller 42A is supported by the first chute member 35 at a position just below the separation roller 42 and is pressed against the separation roller 42. When there exists one sheet SH to be nipped by the separation roller 42 and the retard roller 42A, rotation of the retard roller 42A is allowed by a torque limiter which is not illustrated. On the other hand, when there exist a plurality of sheets SH to be nipped by the separation roller 42 and the retard roller 42A, the rotation of the retard roller 42A is stopped by the torque limiter which is not illustrated. As a result, the retard roller 42A applies a force for stopping the conveyance of the sheet SH with respect to the sheet SH other than the sheet SH in contact with the separation roller 42.

The first conveyance roller 43 is disposed at a connection part between the first guide 31 and the second guide 32 to be opposite to the conveyance surface 35G of the first chute member 35 from above. The first pinch roller 43P is supported by the first chute member 35 and is pressed against the first conveyance roller 43. The first conveyance roller 43 and the first pinch roller 43P nip the sheet SH separated one by one by the separation roller 42 and the retard roller 42A and then convey the nipped sheet SH toward the second guide 32.

The second conveyance roller 44 is disposed at a connection part between the second guide 32 and the third guide 33 to be opposite to the guide surface 36G of the second chute member 36 from below. The second pinch roller 44P is supported by the second chute member 36 and is pressed against the second conveyance roller 44. The second conveyance roller 44 and the second pinch roller 44P nip the sheet SH to be conveyed by the first conveyance roller 43 and the first pinch roller 43p and then convey the nipped sheet SH toward the reading surface 8B, that is, toward the reading sensor 3S which is stopped at the stationary reading position.

The discharge roller 47 and the discharge pinch roller 48 nip the sheet SH which passes over the reading surface 8B and is guided by the discharge guide 61, after which the nipped sheet SH is discharged from the discharge opening 69 toward the discharge tray 96.

<Configurations of First Drive Source, First Drive Train and Second Drive Train>

As illustrated in FIGS. 7 and 9 and the like, the automatic conveyance mechanism 4 includes the first drive source M1, the first drive train 110 and the second drive train 120 for performing the rotation operation of the movable plate 50 and the discharge unit 60. Further, in the embodiment, with respect to each gear forming the first drive source M1, the first drive train 110 and the second drive train 120, illustration of gear teeth formed on the outer peripheral surface is omitted in FIGS. 7 and 9 and the like.

As illustrated in FIG. 5, the first drive source M1 is disposed between the first guide 31 and the third guide 33. As illustrated in FIG. 7, the first drive source M1 is mounted on a surface facing the rear side of the first side frame 9A. A drive shaft of the first drive source M1 protrudes forward further than the first side frame 9A and a drive gear M1G is fixed to the drive shaft thereof. In the embodiment, the first drive source M1 is a stepping motor. The first drive source M1 is controlled by the controller 7 to generate the drive force, thereby rotating the drive gear M1G clockwise and counter-clockwise in FIGS. 9 and 10.

Figure 10:
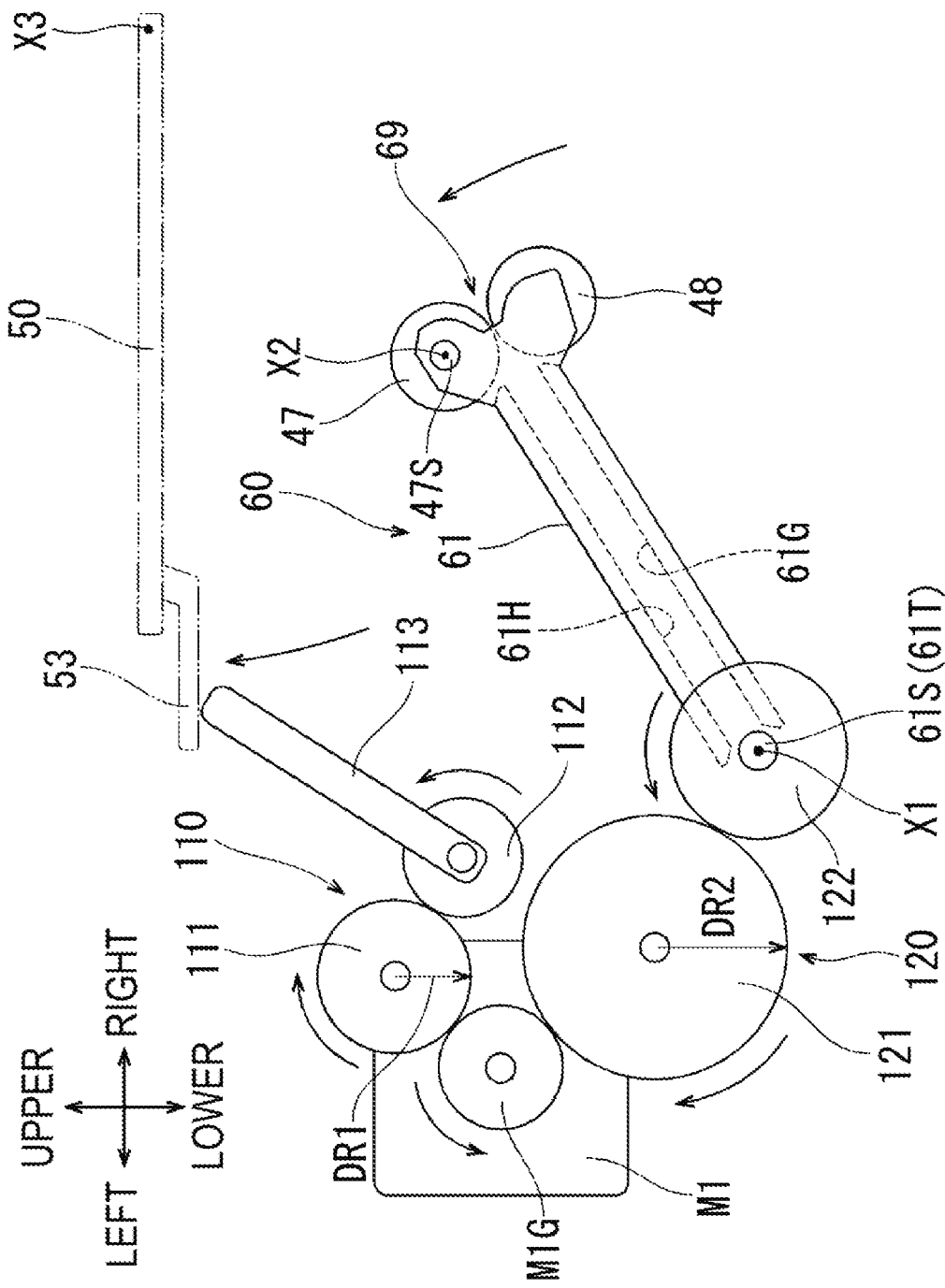
FIG. 10 is a schematic diagram same as that of FIG. 9 and is a diagram illustrating a state where the movable plate is moved to a second position and the discharge unit is moved to a fourth position.

A plurality of arrows illustrated in FIGS. 9 and 10 indicate a rotation direction when the drive gear M1G rotates counter-clockwise in FIGS. 9 and 10. Further, when the drive gear M1G rotates clockwise in FIGS. 9 and 10, the rotation direction becomes a rotation direction opposite to each arrow illustrated in FIGS. 9 and 10.

As illustrated in FIGS. 7 and 9, the first drive train 110 and the second drive train 120 are disposed forward further than the first side frame 9A and are supported by a plurality of shaft units protruding forward from the first side frame 9A.

The first drive train 110 includes a first gear 111, a gear 112 and an arm 113. The first gear 111 is an example of "a first rotation body" of this disclosure. The first gear 111 is positioned rightward and upward with respect to the drive gear M1G and is engaged with the drive gear M1G. The gear 112 is positioned rightward and downward with respect to the first gear 111 and is engaged with the first gear 111. The arm 113 is fixed to a surface facing a front side of the gear 112 and protrudes to the right.

The movable plate 50 includes a passive unit 53. The passive unit 53 is bent after protruding forward from a front and left corner part of a rear surface of the movable plate 50 and protrudes to the left and then abuts on a right end part of the arm 113 from above.

The second drive train 120 includes a second gear 121 and a gear 122. The second gear 121 is an example of "a second rotation body" of this disclosure. The second gear 121 is positioned rightward and downward with respect to the drive gear M1G and is engaged with the drive gear M1G. The gear 122 is fixed to the front shaft unit 61S of the discharge guide 61 o be integrally rotatable. The gear 122 is positioned rightward and downward with respect to the second gear 121 and is engaged with the second gear 121. When the gear 122 rotates, the discharge guide 61 and the discharge roller 47 and the discharge pinch roller 48 supported by the discharge guide 61 integrally rotate with the gear 122.

The first drive train 110 and the second drive train 120 are branched between the first drive source M1 and the first gear 111 and the second gear 121, that is, are parallel with each other with the drive gear M1G as a branch point. In the embodiment, each gear such as the first gear 111, the second gear 121 and the like forming the first drive train 110 and the second drive train 120 is a general gear such as a spur gear, a helical gear and the like.

Next, an operation of the first drive train 110 will be described. When the first drive source M1 rotates the drive gear M1G counter-clockwise in FIG. 9, the first drive train 110 including the first gear 111 transmits a drive force from the first drive source M1 to the movable plate 50 and rotates the movable plate 50 from the first position illustrated in FIGS. 2, 5 and 9 to the second position illustrated in FIGS. 3, 6 and 10.

More specifically, in the first drive train 110, the first gear 111 engaged with the drive gear M1G rotates clockwise in FIG. 9; the gear 112 engaged with the first gear 111 rotates counter-clockwise in FIG. 9; and a right end part of the arm 113 fixed to the gear 112 ascends. As a result, as illustrated in FIG. 10, since the passive unit 53 of the movable plate 50 is pushed upward, the movable plate 50 rotates around the third axis X3 to displace a left end part thereof upward and then moves to the second position illustrated in FIG. 6 and the like.

Further, when the first drive source M1 rotates the drive gear M1G clockwise in FIG. 10, the first drive train 110 including the first gear 111 is operated in a manner opposite to the above-mentioned operation, whereby the right end part of the arm 113 descends. As a result, since the passive unit 53 of the movable plate 50 also descends as illustrated in FIG. 9, the movable plate 50 rotates around the third axis X3 to displace the left end part thereof downward and then moves to the first position illustrated in FIG. 5 and the like.

Next, an operation of the second drive train 120 will be described. When the first drive source M1 rotates the drive gear M1G counter-clockwise in FIG. 9, the second drive train 120 including the second gear 121 transmits the drive force from the first drive source M1 to the discharge unit 60 and then rotates the discharge unit 60 from the third position illustrated in FIG. 5 and the like to the fourth position illustrated in FIG. 6 and the like.

More specifically, in the second drive train 120, the second gear 121 engaged with the drive gear M1G rotates clockwise in FIG. 9 and the gear 122 engaged with the second gear 121 rotates counter-clockwise in FIG. 9. As a result, as illustrated in FIG. 10, since the discharge guide 61 rotates upward integrally with the gear 122, the discharge unit 60 rotates around the first axis X1 to displace the discharge opening 69 upward and then moves to the fourth position illustrated in FIG. 6 and the like.

Further, when the first drive source M1 rotates the drive gear M1G clockwise in FIG. 10, the second drive train 120 including the second gear 121 is operated in a manner opposite to the above-mentioned operation, whereby the gear 122 rotates clockwise in FIG. 10. As a result, since the discharge guide 61 rotates downward integrally with the gear 122 as illustrated in FIG. 9, the discharge unit 60 rotates around the first axis X1 to displace the discharge opening 69 downward and then moves to the third position illustrated in FIG. 5 and the like.

As illustrated in FIG. 5, when the movable plate 50 is in the first position, the left end part of the movable plate 50 is at a position opposite to a lower end part of the regulation surface 35K of the first chute member 35 and an inclination angle of an upper surface of the movable plate 50 is approximately the same as an inclination angle of an upper surface of the supply tray main body 92. In this state, the supply tray 91 can support the sheets SH with the maximum number of stacked sheets. When the movable plate 50 is at the first position and the supply roller 41 abuts on the uppermost sheet SH of the maximum number of stacked sheets SH, the posture of the holder 42F becomes the appropriate posture illustrated in FIG. 5.

As illustrated in FIG. 6, when the movable plate 50 is at the second position, the left end part of the movable plate 50 is at a position opposite to the upper end part of the regulation surface 35K of the first chute member 35 and the upper surface of the movable plate 50 is in a state of extending approximately horizontally at the same height as that of the conveyance surface 35G of the first chute member 35. In this state, the supply tray 91 supports about one to several numbers of the sheets SH. When the movable plate 50 is at the second position and the supply roller 41 abuts on the uppermost sheet SH of the one to several numbers of the sheets SH, the posture of the holder 42F becomes the appropriate posture illustrated in FIG. 6.

When it is determined that the posture of the holder 42F is in a state of descending beyond an allowable range from the appropriate posture illustrated in FIGS. 5 and 6 based on a detection signal of the holder posture detection sensor 42J, the controller 7 operates the first drive source M1 to rotate the movable plate 50 little by little from the first position illustrated in FIG. 5 and the like to the second position illustrated in FIG. 6 and the like, thereby controlling the holder 42F to maintain the appropriate posture illustrated in FIGS. 5 and 6. At this time, it is possible to position the movable plate 50 in a desired rotation posture with high accuracy by finely changing a rotation posture of the arm 113 by rotation angle control of the first drive source M1 which is the stepping motor.

When the controller 7 rotates the movable plate 50 little by little by operating the first drive source M1, the drive force from the first drive source M1 is also transmitted to the discharge unit 60 by the second drive train 120. Accordingly, the discharge unit 60 rotates little by little from the third position illustrated in FIG. 5 and the like to the fourth position illustrated in FIG. 6 and the like in synchronization with the small rotation of the movable plate 50. The image reading apparatus 1 achieves miniaturization in the up and down direction by a configuration in which the discharge unit 60 rotates according to the rotation of the movable plate 50 of the supply tray 91.

As illustrated in FIG. 5, when the discharge unit 60 is at the third position, the discharge opening 69, the discharge roller 47 and the discharge pinch roller 48 are at positions close to the sheet supporting surface 96A of the discharge tray 96. A state of the discharge unit 60 corresponds to a case in which the number of sheets SH supported by the sheet supporting surface 96A of the discharge tray 96 is small.

As illustrated in FIG. 6, when the discharge unit 60 is at the fourth position, the discharge opening 69, the discharge roller 47 and the discharge pinch roller 48 are at positions separated upward from the sheet supporting surface 96A of the discharge tray 96. A state of the discharge unit 60 corresponds to a case in which the sheets SH are supported by the sheet supporting surface 96A of the discharge tray 96 with the maximum number of stacked sheets. In other words, in this state, the discharge opening 69 of the discharge unit 60 is sufficiently separated upward from the uppermost sheet SH among the sheets SH supported by the sheet supporting surface 96A with the maximum number of stacked sheets.

As illustrated in FIG. 6, a moving amount of the movable plate 50 when the movable plate 50 rotates from the first position illustrated in FIG. 5 and the like to the second position illustrated in FIG. 6 and the like is defined as L1. A moving amount of the discharge unit 60 when the discharge unit 60 rotates from the third position illustrated in FIG. 5 and the like to the fourth position illustrated in FIG. 6 and the like, is defined as L2.

In the embodiment, as illustrated in FIG. 9, in order to appropriately set the moving amount L1 of the movable plate 50 and the moving amount L2 of the discharge unit 60 according to the required specifications, a radius DR1 of the first gear 111 and a radius DR2 of the second gear 121 are different from each other. The radius DR1 of the first gear 111 is an example of "a diameter of the first rotation body" of this disclosure. The radius DR2 of the second gear 121 is an example of "a diameter of the second rotation body" of this disclosure.

Specifically, the radius DR2 of the second gear 121 is set to be larger than the radius DR1 of the first gear 111 so that the moving amount L2 of the discharge unit 60 becomes smaller than the moving amount L1 of the movable plate 50. Further, setting of a size relationship between the radius DR1 of the first gear 111 and the radius DR2 of the second gear 121 is set in consideration of a relative relationship between other gears and the like forming the first drive train 110 and the second drive train 120. In the embodiment, the radius DR2 of the second gear 121 is set to be larger than the radius DR1 of the first gear 111 and a length L113 from a rotation center of the gear 112 to a tip of the arm 113 is set to be smaller than a length L69 from the first axis X1 to the discharge opening 69. Further, although illustration is omitted, in the embodiment, the radius DR2 of the second gear 121 can be set to be smaller than the radius DR1 of the first gear 111.

<Image Reading Operation>

In the image reading apparatus 1, when reading an image on a document supported by the document supporting surface 8A, the controller 7 operates the scanning mechanism, which is not illustrated, by controlling the scanning mechanism drive source 3M of the reading unit 3 and moves the reading sensor 3S in the left and right direction from a reading start position below a left end edge of the document supporting surface 8A to a reading end position below a right end edge thereof. Accordingly, the reading sensor 3S reads the image on the document supported by the document supporting surface 8A. Thereafter, the controller 7 operates the scanning mechanism, which is not illustrated, in a reverse direction by controlling the scanning mechanism drive source 3M of the reading unit 3 and then moves the reading sensor 3S which completes the reading from a right end to a left end in the reading unit 3, thereby returning to a standby position.

Further, in the image reading apparatus 1, the sheet SH supported by the supply tray 91 is conveyed by the automatic conveyance mechanism 4; when reading the image on the sheet SH, the controller 7 operates the scanning mechanism, which is not illustrated, by controlling the scanning mechanism drive source 3M of the reading unit 3; and the reading sensor 3S is stopped at the stationary reading position below the reading surface 8B. Here, it is assumed that the movable plate 50 is at the first position illustrated in FIG. 5 and the like, the discharge unit 60 is at the third position illustrated in FIG. 5 and the like and the sheet SH is in a state of not being supported by the discharge tray 96.

Next, the controller 7 determines whether or not the holder posture detection sensor 42J is in the appropriate posture illustrated in FIGS. 5 and 6 based on the detection signal of the holder posture detection sensor 42J. When the holder posture detection sensor 42J is not in the appropriate posture illustrated in FIGS. 5 and 6, the controller 7 operates the first drive source M1, the first drive train 110 and the second drive train 120. Then, the controller 7 rotates the movable plate 50 little by little from the first position illustrated in FIG. 5 and the like to the second position illustrated in FIG. 6 and the like and controls the holder 42F so that the appropriate posture thereof illustrated in FIGS. 5 and 6 is maintained. At this time, the discharge unit 60 also rotates little by little from the third position illustrated in FIG. 5 and the like to the fourth position illustrated in FIG. 6 and the like in synchronization with the small rotation of the movable plate 50.

Next, the controller 7 operates the second drive source M2 and the conveyance drive train 130. Accordingly, the controller 7 drives the supply roller 41, the separation roller 42, the first conveyance roller 43, the second conveyance roller 44 and the discharge roller 47 and supplies the sheet SH supported by the supply tray 91 to the conveyance guide 30 to sequentially convey the supplied sheet SH along the conveyance guide 30. When the conveyed sheet SH passes over the reading surface 8B, the controller 7 reads the image on the conveyed sheet SH by the reading sensor 3S which is stopped at the stationary reading position. Next, the controller 7 discharges the sheet SH whose image is read out from the discharge opening 69 toward the discharge tray 96 by the discharge guide 61, the discharge roller 47 and the discharge pinch roller 48 of the discharge unit 60.

Meanwhile, the controller 7 rotates the movable plate 50 little by little toward the second position illustrated in FIG. 6 and the like according to the decrease of the sheets SH supported by the supply tray 91 based on the detection signal of the holder posture detection sensor 42J and rotates the discharge unit 60 little by little toward the fourth position illustrated in FIG. 6 and the like. As illustrated in FIG. 6, when the number of sheets SH supported by the supply tray 91 decreases and the sheet SH runs out, the controller 7 stops the second drive source M2 and terminates the image reading operation.

Thereafter, the controller 7 operates the scanning mechanism, which is not illustrated, by controlling the scanning mechanism drive source 3M of the reading unit 3 and then returns the reading sensor 3S to the standby position. Further, the controller 7 operates the first drive source M1, the first drive train 110 and the second drive train 120 after confirming that the sheet SH is not supported by the discharge tray 96 by a detection means which is not illustrated, returns the movable plate 50 to the first position illustrated in FIG. 5 and the like and returns the discharge unit 60 to the third position illustrated in FIG. 5 and the like.

<Operational Effect>

In the image reading apparatus 1 of the first embodiment, as illustrated in FIG. 9, since the radius DR1 of the first gear 111 and the radius DR2 of the second gear 121 are different from each other, it is possible to appropriately set a reduction ratio at which the drive force from the first drive source M1 is transmitted to the movable plate 50 via the first gear 111 and a reduction ratio at which the drive force from the first drive source M1 is transmitted to the discharge unit 60 via the second gear 121, respectively. In an example of FIG. 9, the radius DR2 of the second gear 121 is set to be larger than the radius DR1 of the first gear 111, however, alternatively, the radius DR2 of the second gear 121 can be modified to be set to be smaller than the radius DR1 of the first gear 111.

Accordingly, in the image reading apparatus 1, the moving amount L1 of the movable plate 50 and the moving amount L2 of the discharge unit 60 are not the same and as illustrated in FIG. 6, the moving amount L1 of the movable plate 50 can be set to be larger than the moving amount L2 of the discharge unit 60. Further, although illustration is omitted, the moving amount L1 of the movable plate 50 can be set to be smaller than the moving amount L2 of the discharge unit 60.

Therefore, in the image reading apparatus 1 of the first embodiment, the moving amount L1 of the movable plate 50 and the moving amount L2 of the discharge unit 60 can be appropriately set according to the required specifications.

As a result, in the image reading apparatus 1, as illustrated in FIGS. 6 and 9, the moving amount L2 of the discharge unit 60 is set to be smaller than the moving amount L1 of the movable plate 50 and from the beginning, the discharge opening 69 is separated from the discharge tray 96 at a certain height, thereby enabling to secure an arrangement space of the discharge pinch roller 48 and the like which are components of the discharge unit 60.

Further, in the image reading apparatus 1, although illustration is omitted, the moving amount L2 of the discharge unit 60 is set to be larger than the moving amount L1 of the movable plate 50 and thus the discharge opening 69 can be always set higher than the uppermost sheet SH even when a plurality of curled sheets SH are discharged to the discharge tray 96 to form a bulky stacked state.

Further, as illustrated in FIG. 9, in the image reading apparatus 1, the first drive train 110 and the second drive train 120 are branched between the first drive source M1 and the first gear 111 and the second gear 121, that is, are parallel with each other with the drive gear M1G as a branch point. According to the configuration, in the image reading apparatus 1, it is possible to improve both drive efficiency of driving the movable plate 50 via the first gear 111 and drive efficiency of driving the discharge unit 60 via the second gear 121.

In the image reading apparatus 1, as illustrated in FIGS. 6 and 9, the size relationship between the radius DR1 of the first gear 111 and the radius DR2 of the second gear 121 is set so that the moving amount L2 of the discharge unit 60 becomes smaller than the moving amount L1 of the movable plate 50. Specifically, the radius DR2 of the second gear 121 is set to be larger than the radius DR1 of the first gear 111. Accordingly, from the beginning, the discharge opening 69 is separated from the discharge tray 96 at the certain height, thereby enabling to secure the arrangement space of the discharge pinch roller 48 and the like which are the components of the discharge unit 60.

Further, in the image reading apparatus 1, the first rotation body is the first gear 111 and the second rotation body is the second gear 121. Here, in the case of assuming a configuration in which the first rotation body and the second rotation body are respectively formed as pulleys around which belts are wound, there exists a risk that the drive efficiency of driving the movable plate 50 via the first rotation body and the drive efficiency of driving the discharge unit 60 via the second rotation body may deteriorate due to expansion and contraction of the belts and the like. In this point, since the first embodiment is based on the configuration described above, the deterioration in the drive efficiency of the first rotation body which is the first gear 111 and the deterioration in the drive efficiency of the second rotation body which is the second gear 121 can be prevented, thereby enabling to rotate the movable plate 50 and the discharge unit 60 with high accuracy.

Further, in the image reading apparatus 1, as illustrated in FIG. 5, the first drive source M1 and the second drive source M2 are disposed between the first guide 31 and the third guide 33. The first drive source M1 and the second drive source M2 are disposed to be separated from each other at a front portion and a rear portion of a space which is surrounded by the conveyance guide 30 extending in an approximately U-shape from the supply tray 91 toward the discharge tray 96. Accordingly, the space which is surrounded by the conveyance guide 30 extending in the approximately U-shape from the supply tray 91 toward the discharge tray 96 can be effectively utilized as arrangement spaces of the first drive source M1 and the second drive source M2. As a result, miniaturization of the image reading apparatus 1 can be achieved.

Further, in the image reading apparatus 1, as illustrated in FIGS. 7 to 9 and the like, according to separately operating the first drive source M1 and the second drive source M2, it is possible to appropriately perform the rotation operation of the movable plate 50 and the discharge unit 60 and the conveyance operation of the sheet SH performed by the supply roller 41, the separation roller 42, the first conveyance roller 43, the second conveyance roller 44 and the discharge roller 47 respectively.

Further, in the image reading apparatus 1, the first drive source M1, the first drive train 110 including the first gear 111 and the second drive train 120 including the second gear 121 are supported by the first side frame 9A. The second drive source M2 and the conveyance drive train 130 are supported by the second side frame 9B. According to the configuration, the first drive source M1, the first drive train 110 and the second drive train 120 which perform the rotation operation of the movable plate 50 and the discharge unit 60 and the second drive source M2 and the conveyance drive train 130 which perform the conveyance operation of the sheet SH by the supply roller 41, the separation roller 42, the first conveyance roller 43, the second conveyance roller 44 and the discharge roller 47 are divided to be disposed at a front side of the conveyance guide 30 and a rear side thereof. As a result, in the image reading apparatus 1, it is possible not only to prevent interference between the first drive source M1, the first drive train 110 and the second drive train 120 and the second drive source M2 and the conveyance drive train 130, but also to reduce the arrangement space thereof.

Second Embodiment

Figure 11:
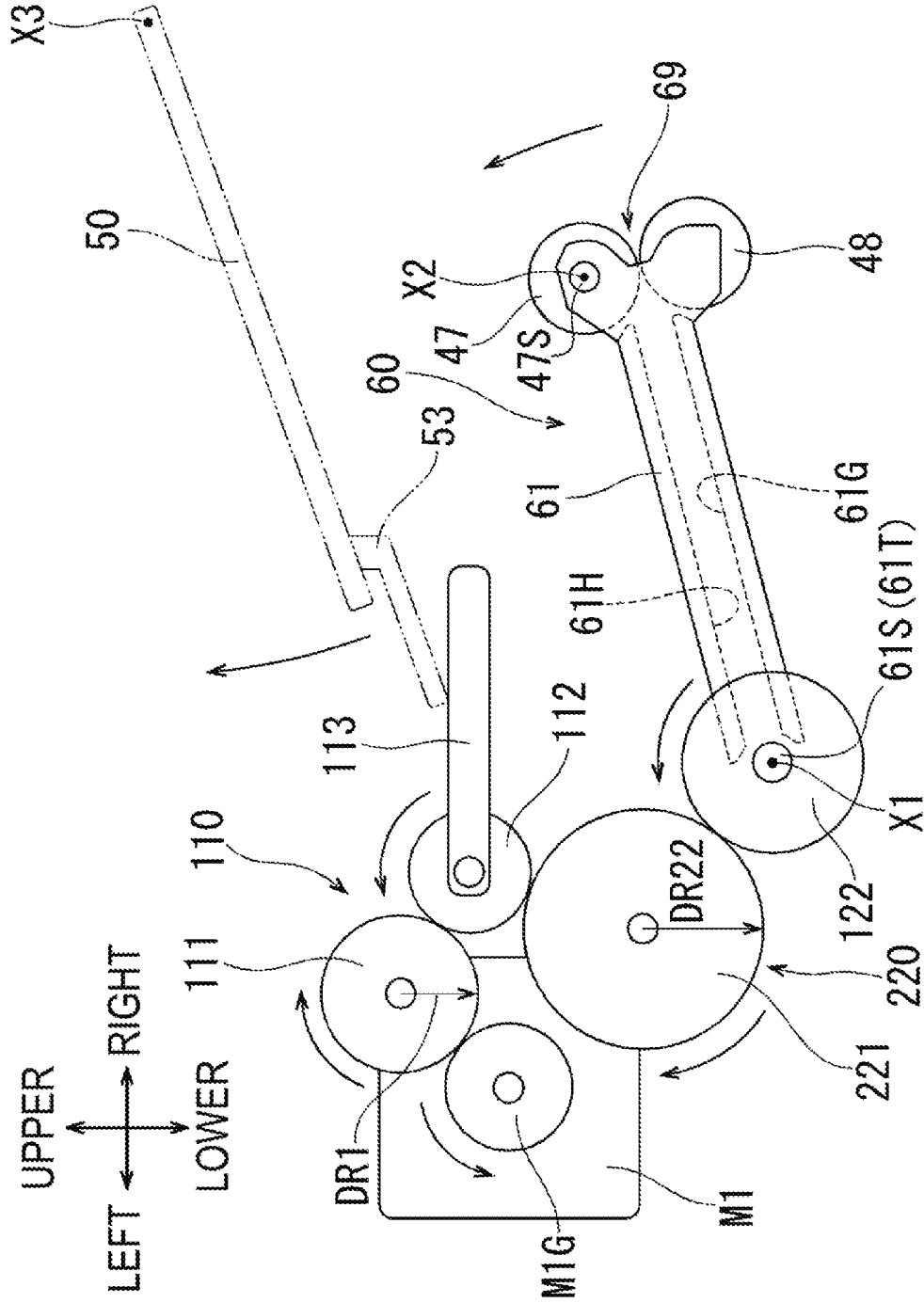
FIG. 11 is a schematic diagram same as that of FIG. 9 and is a diagram illustrating a state where the movable plate is positioned at a first position and the discharge unit is positioned at a third position in an image reading apparatus according to a second embodiment.
Figure 12:
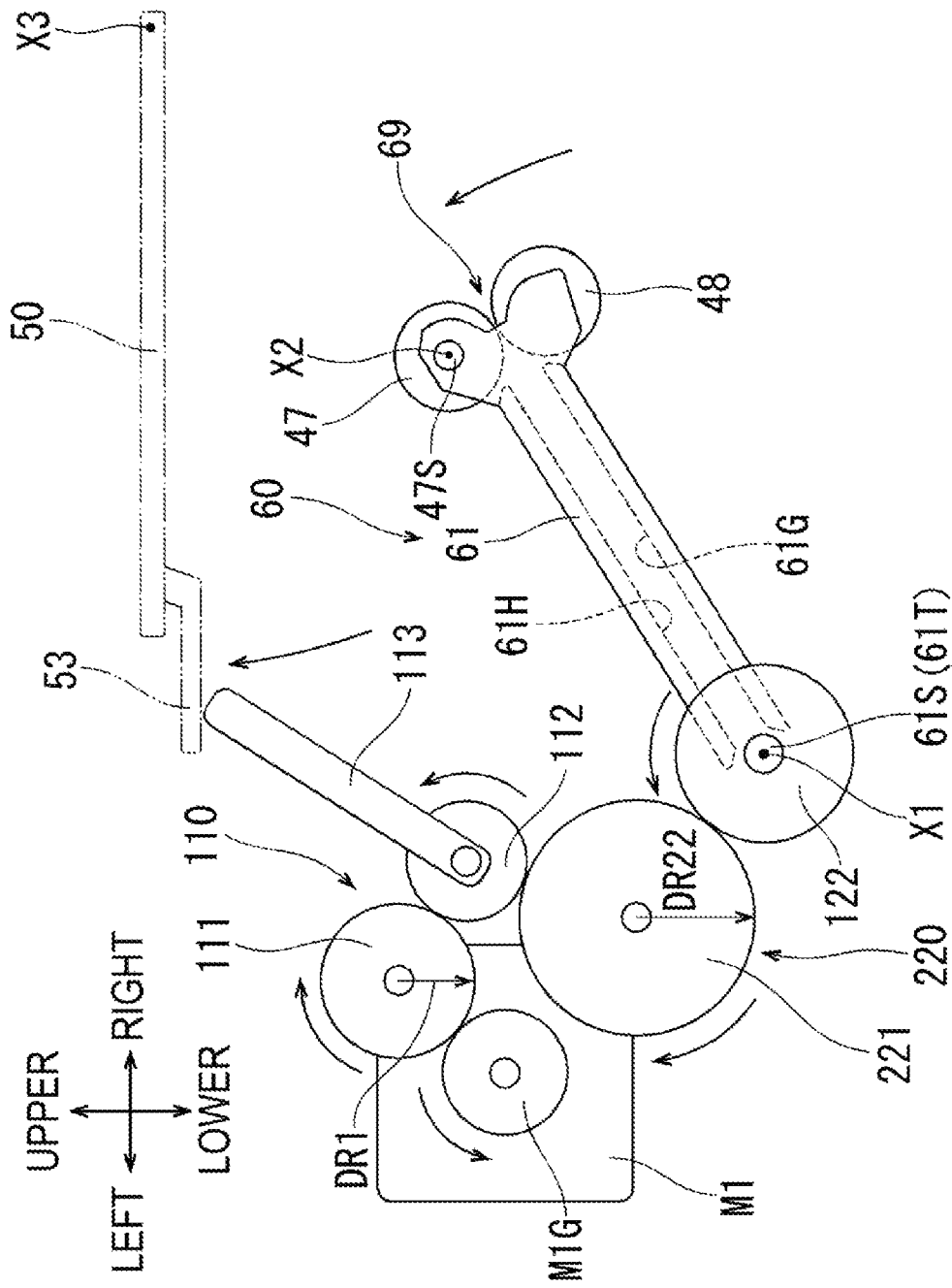
FIG. 12 is a schematic diagram same as that of FIG. 11 and is a diagram illustrating a state where the movable plate is moved to a second position and the discharge unit is moved to a fourth position.

As illustrated in FIGS. 11 and 12, in the image reading apparatus of a second embodiment, a second drive train 220 is adopted instead of the second drive train 120 according to the first embodiment. The second drive train 220 is the only modification in which the second gear 121 of the second drive train 120 according to the first embodiment is modified to a second gear 221. The second gear 221 is an example of the "second rotation body" of this disclosure.

The second gear 221 is positioned below the gear 112 of the first drive train 110 and is engaged with the gear 112. Further, the second gear 221 is positioned leftward and upward with respect to the gear 122 of the second drive train 220 and is engaged with the gear 122. That is, the second drive train 220 is in series with the first drive train 110, and the drive force from the first drive source M1 is transmitted to the discharge unit 60 via the first drive train 110.

The radius DR1 of the first gear 111 and a radius DR22 of the second gear 221 are different from each other. Specifically, the radius DR22 of the second gear 221 is set to be larger than the radius DR1 of the first gear 111. Further, although illustration is omitted, in the embodiment, the radius DR22 of the second gear 221 can be set to be smaller than the radius DR1 of the first gear 111.

Other configurations of the second embodiment are the same as those of the first embodiment. Therefore, the same reference signs are denoted to the same configurations as those of the first embodiment, and descriptions thereof will be omitted or simplified.

The image reading apparatus of the second embodiment having such a configuration can appropriately set the moving amount L1 of the movable plate 50 and the moving amount L2 of the discharge unit 60 according to the required specifications in the same manner as that of the image reading apparatus 1 of the first embodiment.

As described above, this disclosure is described according to the first and second embodiments, but this disclosure is not limited to the first and second embodiments and it goes without saying that this disclosure can be applied by being appropriately modified within the scope not deviated from the gist thereof.

In the first and second embodiments, the movable plate 50 is configured to rotate, but is not limited to this configuration, and for example, the movable plate 50 may be linearly moved. The same also applies to the discharge unit.

In the first and second embodiments, the first rotation body is the first gear 111, but the configuration is not limited thereto. For example, the first rotation body may be a pulley. In this case, for example, the first rotation body rotates by a drive pulley fixed to the drive shaft of the first drive source and a timing belt wound around the drive pulley and the first rotation body and the drive force from the first drive source is transmitted to the movable plate. The same also applies to the second rotation body.

For example, this disclosure can be used for an image reading apparatus, a multifunction machine, or the like.

What is claimed is:

1. An image reading apparatus comprising:
    a supply tray comprising a movable plate;
    a discharge tray;
    a conveyor having at least one roller and configured to convey a sheet from the supply tray;
    a reading sensor configured to read image on the sheet to be conveyed on the conveyer;
    a discharge unit comprising a discharge roller and a discharge guide;
    a first drive source configured to generate a drive force;
    a first drive train configured to move the movable plate by transmitting the drive force from the first drive source; and
    a second drive train configured to move the discharge unit by transmitting the drive force from the first drive source,
    wherein when the first drive source generates the drive force in one direction, the movable plate and the discharge unit move upwardly, and a first moving amount of the movable plate is different from a second moving amount of the discharge unit.

2. The image reading apparatus according to claim 1,
    wherein the movable plate is configured to move from a first position to a second position as a number of sheets supported by the supply tray decreases, and the second position is higher than the first position,
    wherein the discharge unit is configured to move from a third position to a fourth position as the number of sheets supported by the supply tray decreases, the fourth position being higher than the third position,
    wherein the first moving amount is a moving amount from the first position to the second position, and
    wherein the second moving amount is a moving amount from the third position to the fourth position.

3. The image reading apparatus according to claim 1,
    wherein the first drive train includes a first rotation body,
    wherein the second drive train includes a second rotation body, and
    wherein a diameter of the first rotation body and a diameter of the second rotation body are different from each other.

4. The image reading apparatus according to claim 3,
    wherein the first drive train and the second drive train are branched between the first drive source and both the first rotation body and the second rotation body and are arranged to be parallel with each other.

5. The image reading apparatus according to claim 3, wherein
    a size relationship between the diameter of the first rotation body and the diameter of the second rotation body is set so that a moving amount of the discharge unit becomes smaller than a moving amount of the movable plate.

6. The image reading apparatus according to claim 3, wherein
    the first rotation body is a first gear and the second rotation body is a second gear.

7. The image reading apparatus according to claim 1, wherein
    the conveyor includes:
        a first guide configured to guide the sheet sent out from the supply tray,
        a second guide, which is connected to the first guide and configured to change a conveyance direction of the sheet in a reverse direction, and
        a third guide, which is connected to the second guide and configured to guide the sheet toward the discharge tray; and
    wherein the first drive source is disposed between the first guide and the third guide.

8. The image reading apparatus according to claim 1, further comprising:
    a conveyance roller;
    a second drive source, which is provided separately from the first drive source and generates a drive source; and
    a conveyance drive train configured to transmit the drive force from the second drive source to the conveyance roller.

9. The image reading apparatus according to claim 8, wherein
    the conveyor includes:
        a first guide configured to guide the sheet sent out from the supply tray;
        a second guide, which is connected to the first guide and configured to change a conveyance direction of the sheet in a reverse direction; and
        a third guide, which is connected to the second guide and configured to guide the sheet toward the discharge tray, and
    wherein the second drive source is disposed between the first guide and the third guide.

10. The image reading apparatus according to claim 8, further comprising:
    a first side frame and a second side frame, which are opposite to each other to sandwich the conveyor in an axial direction of the conveyance roller, wherein:

the first drive source is supported by the first side frame; and the second drive source and the conveyance drive train are supported by the second side frame.

* * * * *